United States Patent

Myer et al.

[15] 3,663,800

[45] May 16, 1972

[54] OPTICAL LABEL READER AND DECODER

[72] Inventors: Jon H. Myer, Woodland Hills; Robert L. Hasslinger, Culver; Francis P. Webster, Simi, all of Calif.

[73] Assignee: Hughes Aircraft Company, Culver City, Calif.

[22] Filed: Jan. 21, 1971

[21] Appl. No.: 108,626

Related U.S. Application Data

[63] Continuation of Ser. No. 716,534, Mar. 27, 1968, abandoned.

[52] U.S. Cl. ..............235/61.11 E, 250/219 D, 235/61.12 N, 235/61.7 B, 340/146.3 K

[51] Int. Cl. ..................G06k 7/14, G06k 19/06, G06k 9/13, G01n 21/30

[58] Field of Search ..............235/61.11 E, 61.11 R, 61.12 N, 235/61.7 B; 340/146.3 K; 250/219 D

[56] References Cited

UNITED STATES PATENTS

| | | | |
|---|---|---|---|
| 2,612,994 | 10/1952 | Woodland | 340/146.3 X |
| 2,933,246 | 4/1960 | Rabinow | 235/61.11 |
| 3,059,521 | 10/1962 | Clemens | 88/1 |
| 3,061,730 | 10/1962 | Jankowitz | 250/203 |
| 3,106,706 | 10/1963 | Kolanowski | 340/146.3 X |
| 3,225,177 | 12/1965 | Stites | 340/146.3 K |
| 3,239,674 | 3/1966 | Aroyan | 250/203 |
| 3,292,149 | 12/1966 | Bourne | 340/146.3 |
| 3,356,021 | 12/1967 | May | 235/61.12 X |
| 3,465,130 | 9/1969 | Beltz | 235/61.115 X |
| 3,474,234 | 10/1969 | Rieger | 235/61.115 X |

*Primary Examiner*—Thomas A. Robinson
*Assistant Examiner*—Robert M. Kilgore
*Attorney*—Robert Thompson and James K. Haskell

[57] ABSTRACT

A coded label having a leader, a unique preamble word and data words coded thereon, a system for optically reading the label, including a rotary bar scan optics for continually scanning a label from different incremental angles and generating pulse signals in response to a code thereon, and a decoder coupled to receive the pulse signals which is responsive to the leader and to the unique preamble before decoding the data words of the label, wherein the data will be decoded and displayed only after the label data words have been read twice and compared and the data is complete.

11 Claims, 16 Drawing Figures

INVENTORS.
JON H. MYER,
ROBERT L. HASSLINGER,
FRANCIS P. WEBSTER,
BY Robert Thompson
ATTORNEY Patented May 16, 1972 3,663,800

14 Sheets-Sheet 10

OPTICAL LABEL READER AND DECODER

This is a continuation of co-pending patent application Ser. No. 716,534, filed Mar. 27, 1968.

BACKGROUND OF THE INVENTION

This invention relates generally to coded labels, coded information reading, and automatic coded information processing, and relates more particularly to coded label reading optics and coded label information signal processing means.

In many enterprises, large numbers of items must be handled during a given time period. For example, grocery stores, post offices, or parts supply warehouses must handle large volumes of items which must be properly handled so that the recipient would be correctly billed and/or the item would be inventoried. In many instances, this could be done by hand or manually. In other instances, this handling could be done automatically by the use of coded tags or the like, fastened to the items, which tags could be read by an appropriate reader. It could also be possible to place a code marker or information at a predetermined location on the item so that the information would always be at a predetermined location and/or in a predetermined orientation as the information was fed past a reader station. Furthermore, by proper selection of the coded medium and the particular reading technique used, it could be possible to reduce background noise error signals which could otherwise affect the accuracy of the processing.

SUMMARY OF THE INVENTION

Accordingly, an object of this invention is to provide means and methods for reading coded information which has the advantages of being substantially independent of the orientation and position of the coded information.

Another object is to provide means and methods for automatically reading a coded medium on an object so that only the coded information on the medium is processed.

Still another object is to provide improvements in a coded label, label reading optics, and the code processing circuitry in a label reading system of the above type.

Other objects of this invention can be attained by providing a coded label format of contrasting bar markings which includes a leader portion at least one word long, and a unique preamble word followed by data words with each word being started by a sync marking and ended by a reset marking that contrast with one another. The advantages of this format are that the label can be read from only one direction to produce valid information signals and that the reader and the decoder are synchronized with every word.

A label reader is positioned under a counter top so that when an object having a coded label fastened thereto is placed upon a window associated with the reader, the reader optics scans the label with a bar light beam that scans or sweeps radially inward through a point on the window. In addition, the beam is continually rotated about the point by the reader optics so that each subsequent scan through the point occurs from a slightly different radial angle than the previous scan throughout the entire 360° of rotation. Thus, when the bar light beam scans the label, the label reader generates information signals corresponding to the coded information. As a result, the coded label can be read independently of its orientation or position when substantially parallel to a focal plane.

A decoder, which is coupled to receive information signals produced when the label is scanned, is reset in an initial condition by the leader and is then subsequently enabled to process the data words only after the signals associated with the unique preamble are received. In processing the information, the reset signal at the end of each word must occur during a predetermined time period following the sync signal at the beginning of each word or else the decoder will not process the data word information and will be returned to its initial condition after a predetermined time delay so that the label can again be read. In addition, before the data words are displayed or otherwise further processed, the label is read a second time and the data words of the second reading compared with the corresponding data words stored during the previous reading. As a result, only valid, complete, and verified data will be processed and displayed. In addition, data words can be inserted into the decoder manually, and data words that have been already read and stored can be deleted by manual operation of the operator.

Other objects, features and advantages of this invention will become apparent upon reading the following detailed description and referring to the accompanying drawings.

DESCRIPTION OF THE PREFERRED EMBODIMENT

Figure 1:
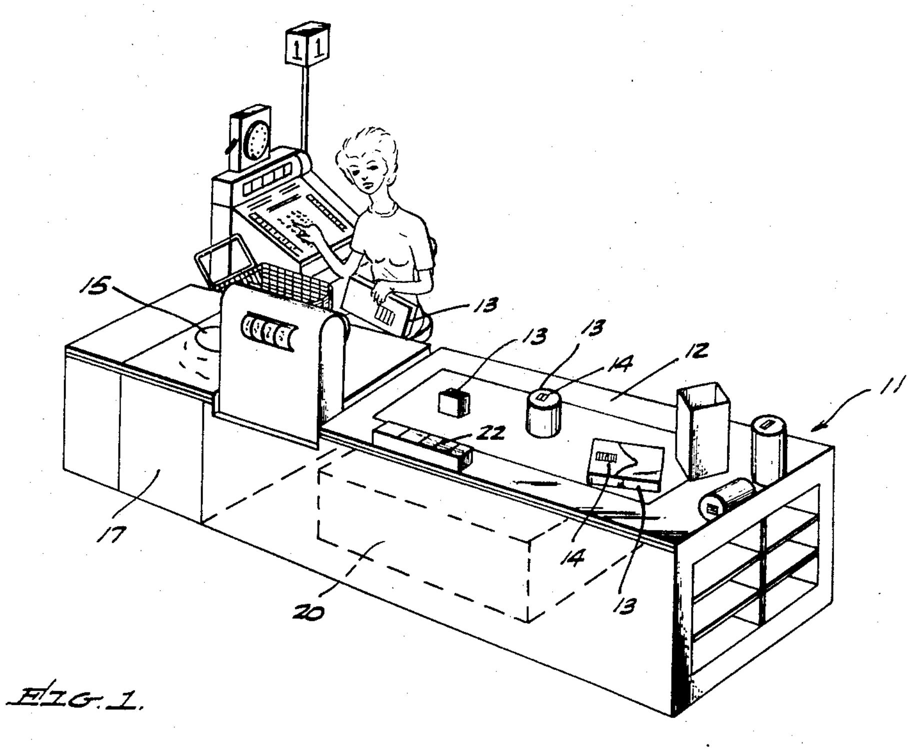
FIG. 1 is a perspective of one utilization of an embodiment of the invention in a grocery checkout stand, where items placed on a window located in the counter top are read, the information decoded, and then displayed.

Referring now to the details of an embodiment which is incorporated in a grocery checkout stand, FIG. 1 illustrates a checkout stand 11 having a top surface 12 which receives items of merchandise 13 placed thereon. Each item of merchandise 13 has at least one coded label 14 fastened to a surface which is flat enough so that the entire label surface is within a predetermined depth of focus or field when placed substantially parallel to the top surface 12. As the merchandise 13 is passed over a transparent window 15 or aperture of an optical reader 17 located within the checkout stand, the labels 14 which are face down are optically scanned so that coded information contained thereon is converted to electrical signals which are fed to a decoder 20 within a range of data rates. The decoder 20 processes the signals to determine if the coded information is valid and processes it into a decimal format so that it can be processed such as displayed on a digital display 22 for the benefit of a cashier and a customer. It should, of course, be understood that the coded information could also be further processed to operate as an inventory routing system.

Figure 2:
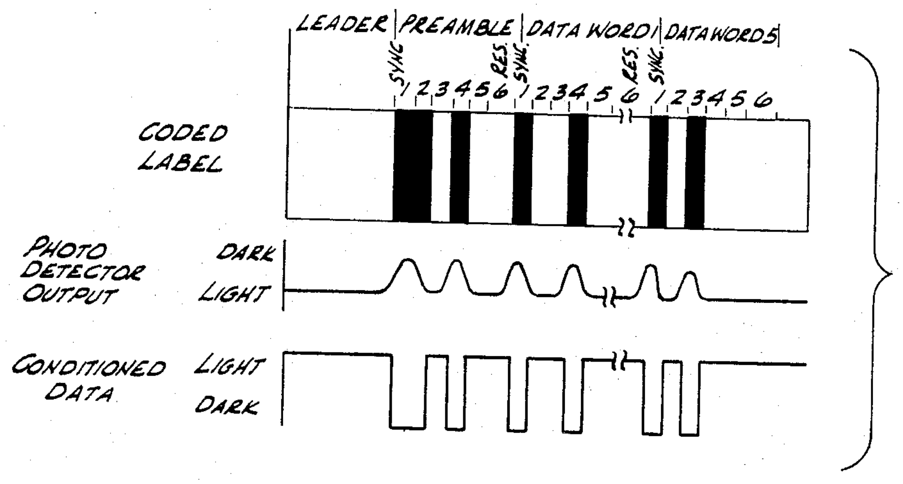
FIG. 2 is a graphical illustration of a label with a preferred code format, including a leader, a preamble word, and a series of data words coded by a series of contrasting bar markings.

Referring now to the label 14 in more detail, one label format as illustrated in FIG. 2 can include a flat, rectangular piece of material having an adhesive backing (not shown) which is operable to adhere or fasten the label to a surface of the merchandise. The other surface of the label, illustrated in FIG. 2, includes linear parallel spaced apart bars of at least two colors which contrast with one another, coded as digital words. For example, the bars representative of a ZERO are black and the other bars representative of a ONE are formed by the backing material and are white. Or they can be of different colors such as fluorescent colors which contrast with one another. Furthermore, they can be treated with different materials which respond in contrasting manner when scanned. In addition, the bars do not have to be linear in all embodiments thereof. In one particular code format, the first portion of the label, when scanned, is operable to reset the decoder 20 to an initial operating state prior to scanning the bars. This is done with a white leader section which is at least one word wide, or in other words, has a duration of at least one word when scanned. In the particular code format illustrated, each word is at least six bits long.

More specifically, the code format includes a plurality of parallel spaced apart bars which form a unique preamble word and data words, each of which are six bits long with an extra wide sixth bit if desired. Structurally, only one bar is utilized in the length of label associated with one bit. The preamble word and all of the data words have a portion thereof associated with a sync bit (bit one) which is black in color (ZERO) and operates to initiate a sampling operation in the decoder 20 (FIG. 1) adjacent the beginning of each word. The next four bits (bit 2 through bit 5) generate data pulse information which is usable by the decoder, as will be explained in more detail shortly. And the last portion thereof (bit 6) adjacent the end of the preceding word or the subsequent word in each word is a reset bit which is white in color (ONE), the time period of which is used to reset the decoder 20 for the next sampling cycle on the next word. This reset bit can be wider than the word bits, thereby insuring that the decoder 20 is reset between each of the words. It should be noted that the sync bit is always black (ZERO) and the reset bit is always white (ONE) and thus contrast with one another. Since the decoder sampling cycle is initiated by black (ZERO), it increases the probability that synchronization is re-established at bit one of each word, thereby eliminating cumulative timing errors. There could, of course, be a reversal of the colors, if desired.

Referring now to the data bits 2 through 5 in each of the words, the data bits in the preamble produce a unique data word when optically scanned. This unique data word is fed to the decoder 20, as will be explained in more detail shortly, wherein it is compared for validity. If it is a valid preamble word such as alternate black and white bars, to generate the word 0101, the decoder 20 is enabled to process the subsequent data words.

In these subsequent data words, the data bits 2 through 5 are binarily coded decimal digits. For example, one binarily weighted code that could be used would be:

| Bit 2 | Bit 3 | Bit 4 | Bit 5 | |
|---|---|---|---|---|
| 2' | 4 | 2 | 1 | Decimal Equivalent |
| 0 | 0 | 0 | 0 | 0 |
| 0 | 0 | 0 | 1 | 1 |
| 0 | 0 | 1 | 0 | 2 |
| 0 | 0 | 1 | 1 | 3 |
| 0 | 1 | 0 | 0 | 4 |
| 1 | 0 | 1 | 1 | 5 |
| 1 | 1 | 0 | 0 | 6 |
| 1 | 1 | 0 | 1 | 7 |
| 1 | 1 | 1 | 0 | 8 |
| 1 | 1 | 1 | 1 | 9 |

With this particular code, there are no forbidden combinations and if black were equal to a binary 0 and white were equal to a binary 1, then all-black bits 0 through 5 would equal to a decimal 0 while all-white bits 2 through 5 would equal a decimal 9. As a result, if there were five data words following the preamble word, it would be possible to generate any decimal number from 0 through 99,999. Of course, it would be possible to generate shorter or longer decimal numbers by the use of fewer or more data words.

Referring now to the operation of the system, the optical reader 20 can be rotary bar scanners of the type illustrated in FIGS. *3a – 3c* which operate independently of the label orientation. For example, a narrow bar of radiation is projected toward the label located at an aperture in the counter and is scanned radially inward or across the label in only one direction. After the first such scan, or during the first such scan, the narrow bar of radiation is angularly reoriented about an optical axis so that it will next scan inward across the label from a slightly different angle. It can be assumed that this incremental change in angular orientation could be less than one or two degrees of rotation. This optical scanning from slightly varying angles is continually repeated so that the table is scanned from angular increments totaling 360°. Thereafter, the merchandise and label can be removed and a new label substituted.

Figure 3A:
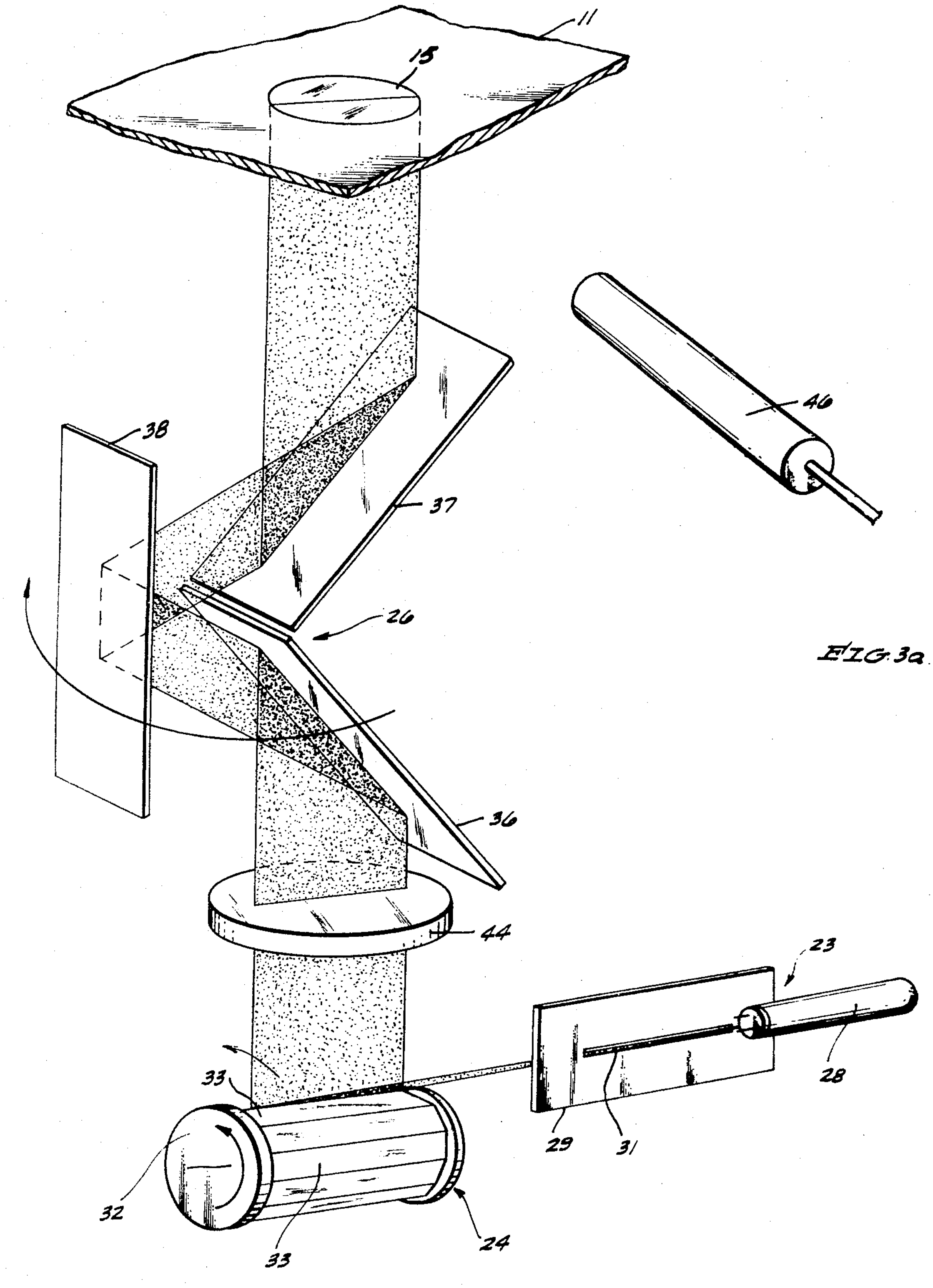
FIGS. 3*a* through 3*e* are schematics of an optical reader illustrating the rotating bar scanner optics and the resulting beam scanning operation across the window.
Figure 3B:
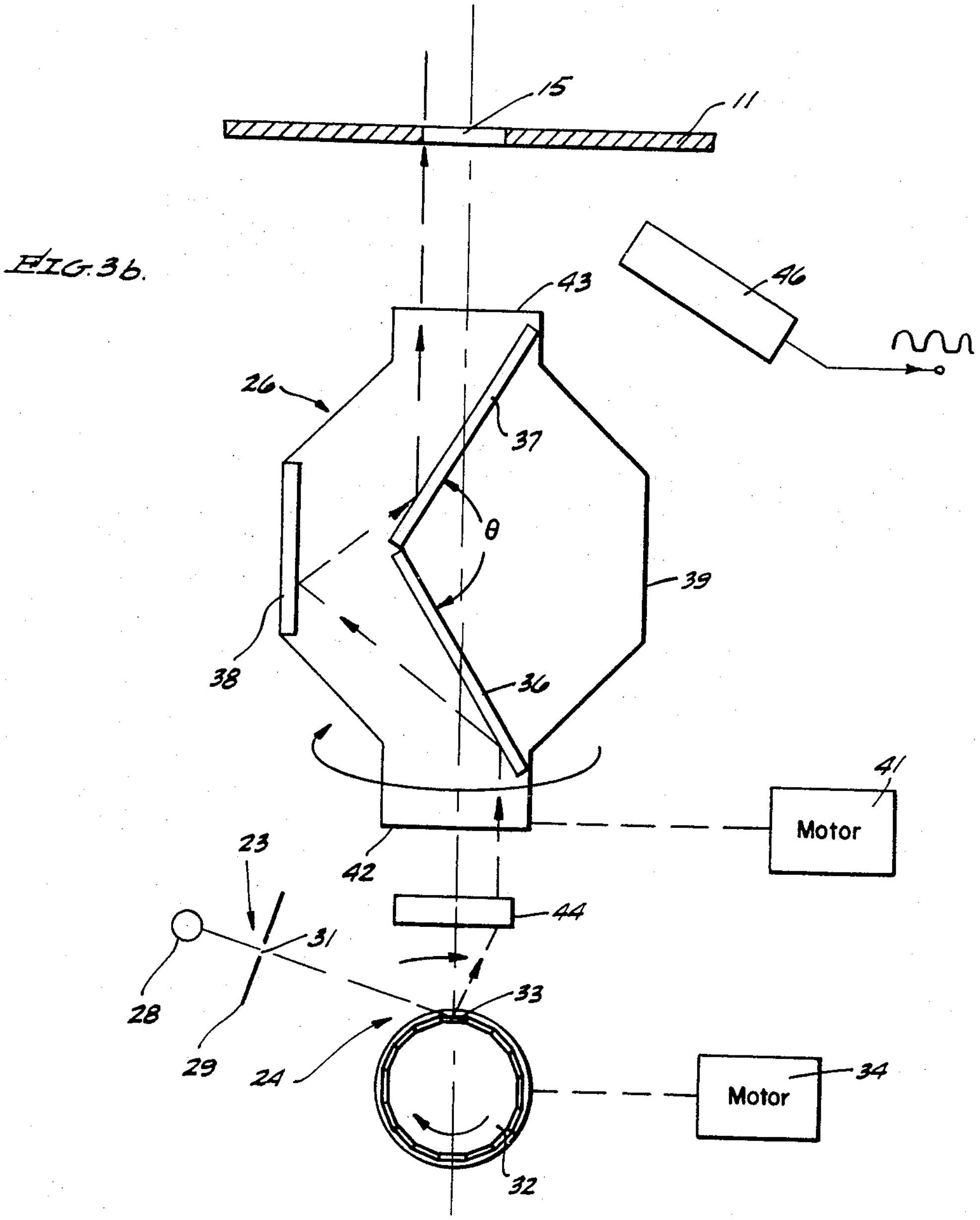

Referring to the details of several optical readers, FIG. 3*a* is a perspective schematic diagram illustrating an exemplary embodiment of an optical reader in accordance with the invention, while FIG. 3*b* illustrates a cross-sectional side view of an optical reader depicted schematically by FIG. 1. The major components of the rotatable bar scanner include: beam shaper optics 23 for providing a light beam 11 having a bar-shaped or elongated rectangular transverse cross-section; beam scanner optics 24 for causing the bar-shaped light beam 11 to be scanned through a lineal scan pattern in a direction transverse to the longer cross-sectional dimension or width of the light beam 11 as indicated by the arrow; and beam rotator optics 26 for continuously changing the angle of the radial scan direction of the light beam projected to a window 15 or aperture by rotation of the bar light beam about an optical axis extending through the center of the window 15.

The beam shaping optics 23 includes, for example, a light source 28 and an opaque mask 29 having an elongated rectangular slit 31 through which a narrow bar-shaped beam of light can pass. The light source 28 can be of any conventional type of lamp, such as a linear filament lamp, manufactured by Chicago Miniature Lamp Works, Type CM8. It is understood that it would be within the scope and spirit of the invention to employ other radiant energy devices including those having any desirable spectral distribution such as may be provided by conventional sources or which may be provided for by the appropriate employment of any of the various conventional and well known filters.

Beam scanner optics 24 may include, for example, a mirror drum 32 with a polygonal periphery having affixed thereto a plurality of flat reflecting elements such as first surface rectangular mirrors 33 which are uniformly secured in juxtaposed relationship, each mirror 33 extending the full length of the drum 16 so as to provide a polygonal reflecting surface or facets on the circumference of the drum. Drum 32 is rotated about its longitudinal axis in a direction generally indicated by the arrow by a motor 34, (FIG. 3*b*) of conventional design, coupled thereto.

Beam rotator optics 26 includes, for example, a reflecting optics characterized by the quality of internally reflecting incident light rays an odd number of times prior to emergence therefrom, exemplary reflecting optics being a Dove or Pechan prism, which are described in the McGraw-Hill Encyclopedia of Science and Technology, 1960, McGraw-Hill Vol. 8, p. 508. As an alternative, a mirror complex constructed to simulate the reflecting surfaces of the aforementioned prisms may be employed as beam rotator optics 26, such employment being particularly suitable in cases where a large prism is required. Such a mirror complex is employed in a preferred embodiment of the rotatable bar scanner depicted by FIGS. 3*a* and 3*b* in accordance with the invention. Thus, with reference to FIGS. 1 and 2 of the drawings, the beam rotator optics 26 includes three reflecting elements such as first surface mirrors 36, 37 and 38 having planar reflecting surfaces which mirrors are oriented relative to each other in a K-shaped mechanical configuration wherein mirrors 36 and 37 are aligned in end-to-end generally angular adjacency with the planar reflecting surfaces situated in a plane orthogonal to a common plane. The optical axis as illustrated in FIG. 3*b* extends through points in the mirrors 36 and 37, respectively, which points are preferably equidistant from the respective edges of mirrors 36 and 37. Mirror 38 is situated parallel to the optical axis and positioned from the apex of mirrors 36 and 37 symmetrically therewith. Each of the mirrors 36, 37, and 38 may be suitably mounted and retained in an appropriate housing 39 adapted to be rotated about a mechanical axis, which in this case is the optical axis by a suitable motor 41 and appropriate mechanical coupling such as gears or pulleys. The housing 39 can include two annular openings at the ends 42 and 43 through which the bar-shaped light beam passes towards mirror 36 and through which the beam is reflected from mirror 37, respectively. An exemplary angle $\theta$ usable between mirrors 36 and 37 would be 120°; however, the angle $\theta$ may be varied as is practical and desirable to modify the physical configuration of the mirror complex.

Operationally, the beam shaping optics 23 is situated relative to the beam scanner optics 24 such that the bar-shaped light beam is directed at mirrors 33 with the width or plane of the beam tangential or parallel to the axis of the mirror drum 32. Rotation of the mirror drum 32 about its longitudinal axis in a direction such as indicated by the arrow causes the light beam to be repeatedly scanned, as indicated by the arrow adjacent the beam, across the surface of mirror 36 retained in suitably oriented housing 39, the light beam being continually reflected at a predetermined sweep rate or scan rate by each succeeding mirror 33 as drum 32 is rotated. The beam rotator optics 26 in turn successively rotated the scanned beam about the optical axis on each successive scan so that the scan pattern such as illustrated in FIGS. 3*d* and 3*e* is developed.

Figure 3C:
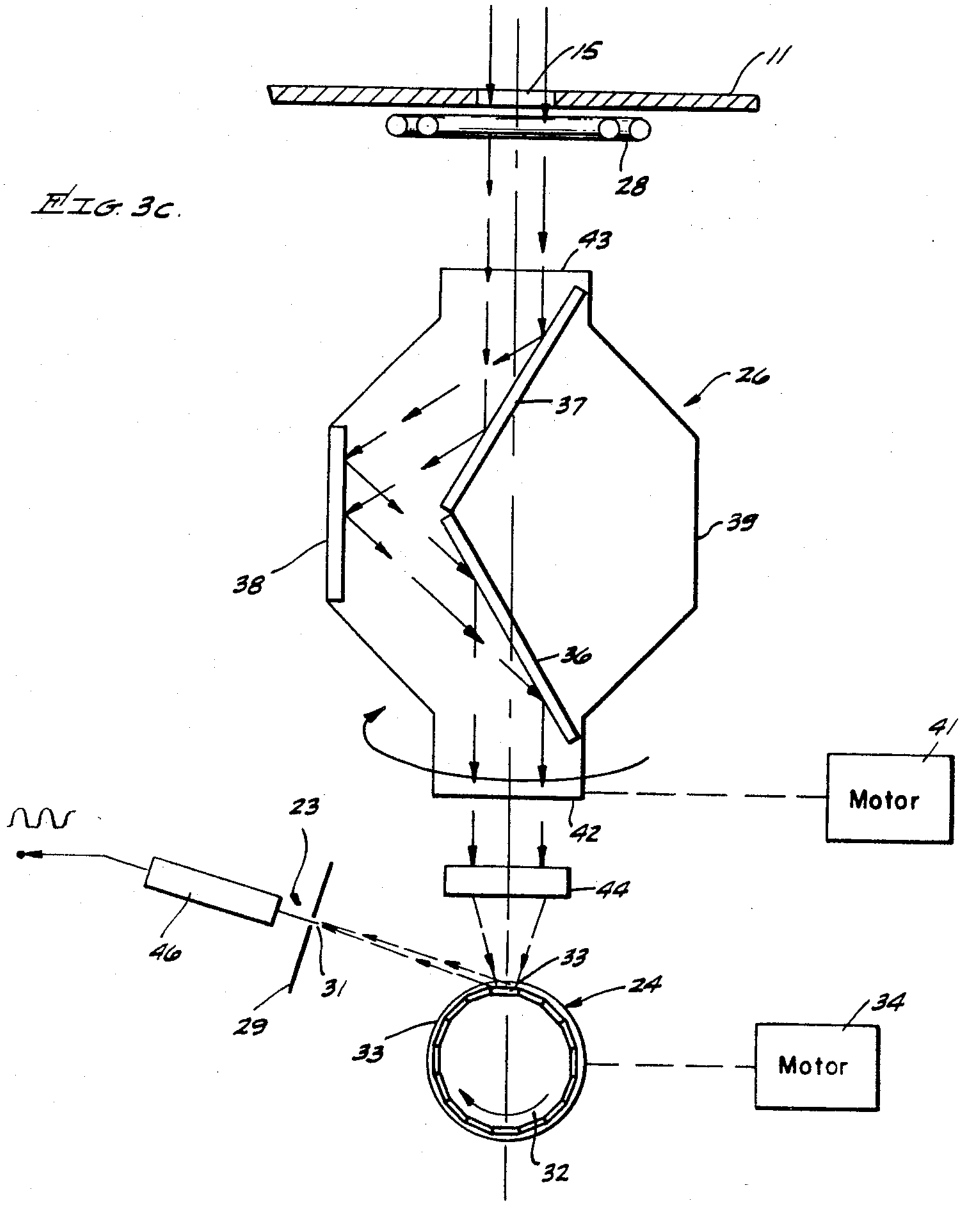

Characteristically, light images entering annular open end 42 of housing 39 will be optically rotated about the optical axis by beam rotator optics 26 through an optical angle twice the mechanical rotation angle of the beam rotator optics 26. For example, if beam rotator optics 26 is rotated 45°, images entering annular end 42 will be rotated 90° upon emerging from housing 39 through end 43. Considering the scan pattern produced by beam scanner optics 24 when observed at a series of instances as a series of parallel line images as illustrated in FIGS. 3*d* and 3*c* resulting from the traversal of bar-shaped beam 11 across a window 15 in a direction indicated by the arrow, eventual rotation of beam rotator optics 26 through an angle of 45° will cause the scan pattern produced by beam scanner optics 24 to be rotated about the optical axis through 90° as is illustrated by FIG. 3e relative to FIG. 3d whereupon the direction of scan as indicated by the arrow is also rotated 90°.

As such, it is apparent that rotation of scan rotator optics 26 about its mechanical axis, which is coaxial with the optical axis will cause incident images such as the scan pattern produced by beam scanner, upon passage through the reflecting complex retained in housing 39 to be angularly rotated about a point so that the scan pattern will enable an object or label positioned on the window 15 to be successively scanned from all possible directions.

Figure 3D:
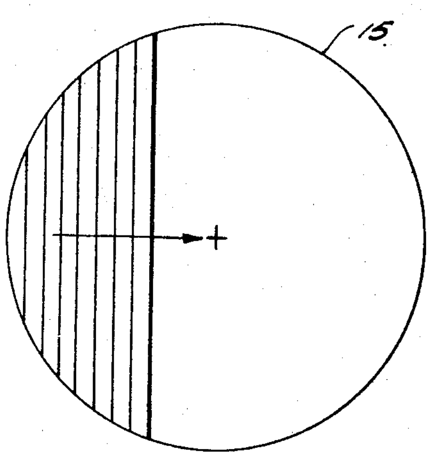
Figure 3E:
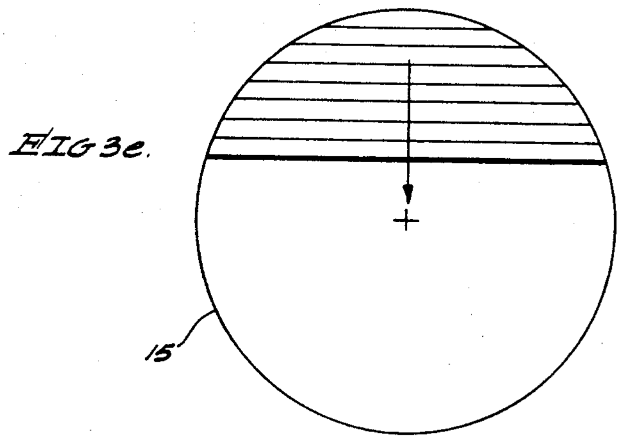

The scan rate of the light beam and the rotation rate of the scan pattern depicted in FIGS. 3*d* and 3*e* may be controlled by appropriately adjusting the respective rotation rates of the mirror drum 32 and mirror housing 39. For example, rotation of mirror drum 32 at a rate of 1,800 rpm and housing 39 at a rate of 150 rpm will result in the directional scan pattern being angularly rotated a small increment during each complete scan period.

When employed as a code reader, the rotatable bar scanner of the present invention is adapted to direct the light beam through an aperture 15 in a supporting surface such as table top or counter surface 11, which is in a plane normal to axis 8. A circular transparent glass plate may be appropriately supported in aperture 15 which is centered on the optical axis. A lens 44 can be employed to focus the scanning light beam along a focal surface or within a focal depth while a photodetector 46 of any of the conventional types well known in the prior art may be employed as a detection device and used in conjunction with appropriate processing apparatus illustrated in FIG. 4. A coded label adapted to reflect light and affixed to an object can be read when placed at the focal depth within aperture 15, the graphic code being irradiated by the bar light beam which is successively scanned across the graphic code from substantially every direction throughout 360°. Light reflected from the irradiated coded label will be directed towards the photodetector 46 which has a detection characteristic enabling detection when, as previously mentioned, the light beam is scanned across the graphic code in a direction wherein the beam width is substantially parallel to the individual parallel bars on the label such that a detectable variation in reflected light intensity results.

The schematic diagram of FIG. 3*c* illustrates a cross-sectional side view of a modified embodiment of the optical code reader of FIGS. 3*a* and 3*b*. The modification in effect consists of reversing the physical placement of the illuminating light source 28 and the photodetector 46. As shown, a light source 28, which may be any of the conventional forms of lamps, is situated adjacent to aperture 15 such that it will serve to illuminate a graphic code stamped on or affixed to a coded object which is placed on the aperture plate 27 for the purpose of being read. The beam rotator optics 26 will serve to rotate reflected light images of the graphic code through predetermined angular increments about the optical axis, in a fashion previously explained, prior to being scanned across slit 31 of opaque mask 29 by beam scanner optics 24, the photodetector 46 which is adapted to have a suitable detection threshold level being situated to detect the varying light intensity resulting from bar images passing through slit 31 when the bar images are rotated by beam rotator so as to be positioned substantially parallel to and superposable with the slit 31.

It is understood that while the optical code reader, in accordance with the invention, has been described in connection with a bar-shaped light beam having substantially no curvature, it may in some instances be desirable to adapt the bar-shaped light beam to have a slight curvature or any other geometrical configuration. Accordingly, the configuration of slit 31 matches the configuration of the code bars or indicia in order to obtain maximum variation in the reflected light intensity when the rotatable beam scans the label.

Figure 5:
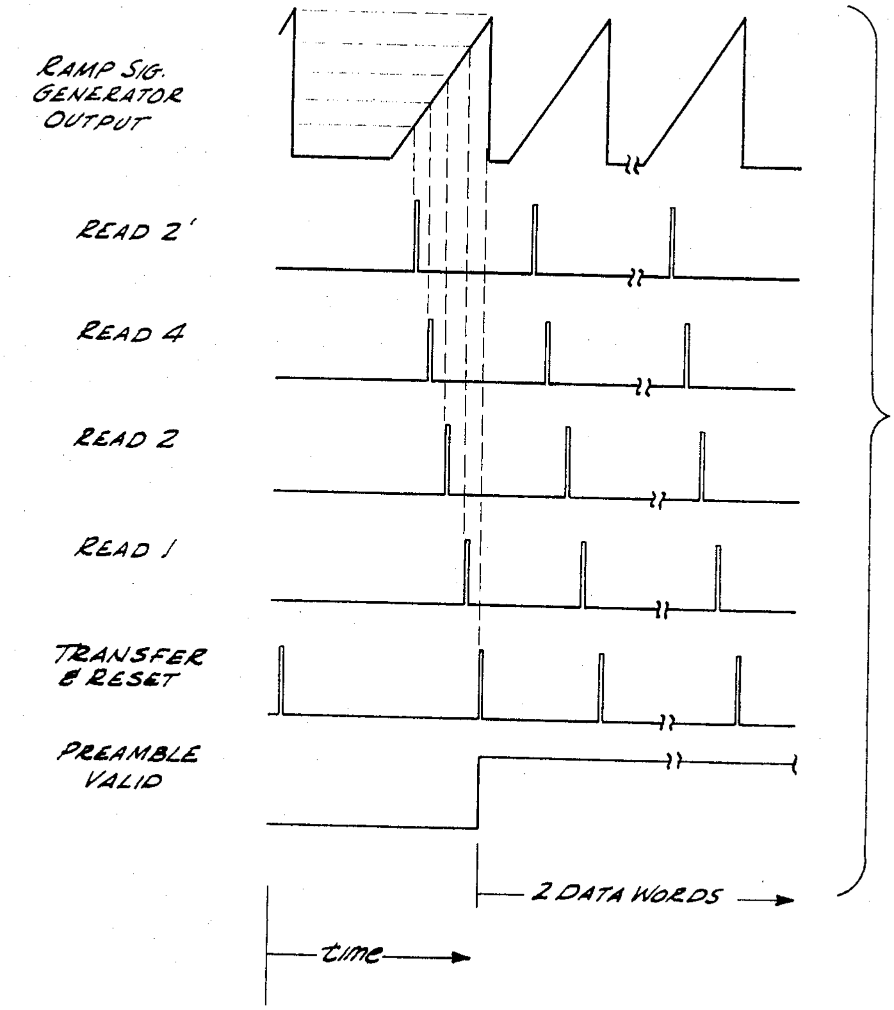
FIG. 5 is a timing chart showing the relationship between the signals generated by the optical reader and the signals generated by the decoder of FIG. 4 when the label of FIG. 2 is read.

In order to facilitate an understanding of the overall operation of the decoder, its operation on a block diagram level will be described first with reference to the block diagrams of FIG. 4 and the waveform timing charts of FIG. 5.

Figure 4:
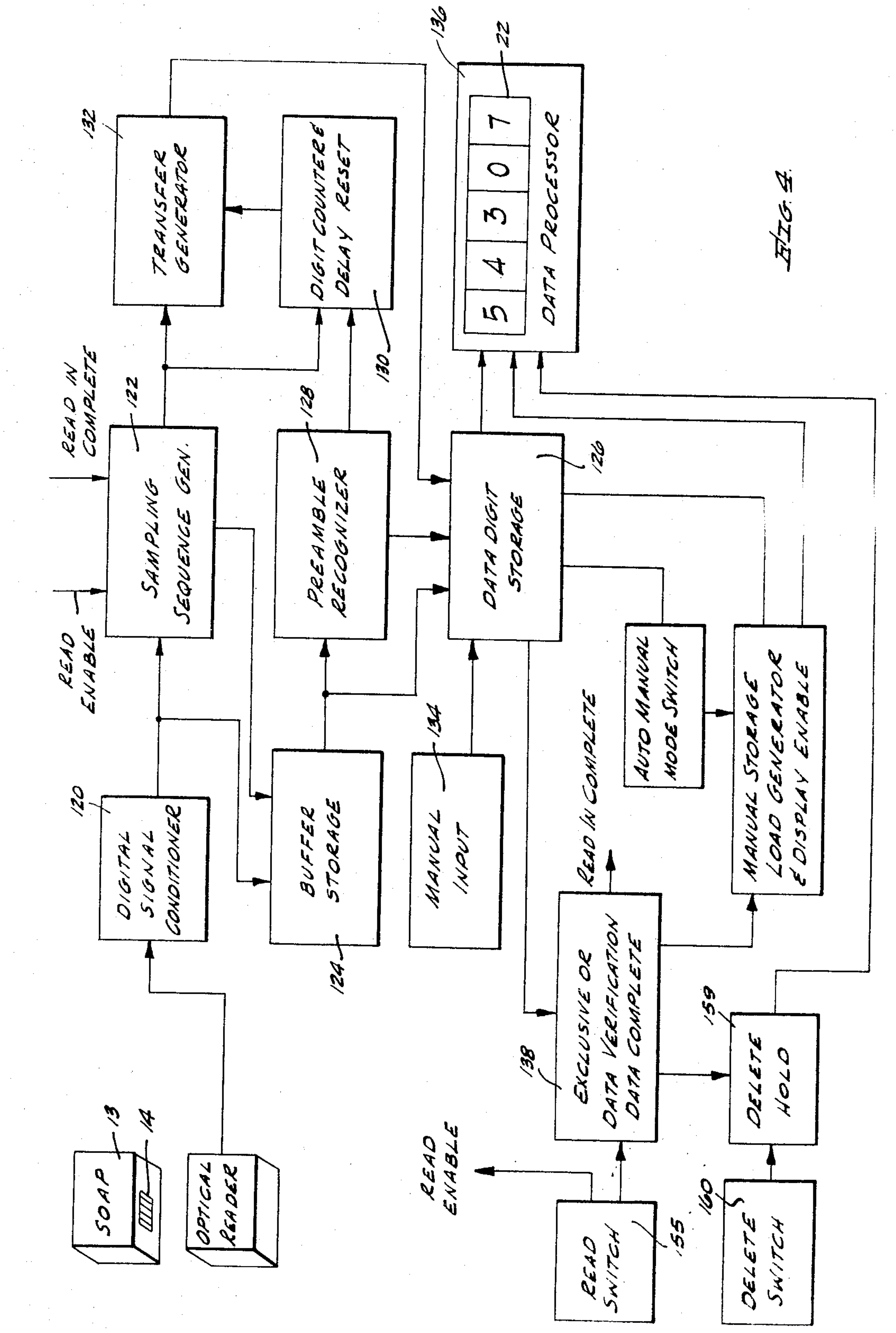
FIG. 4 is a block diagram illustrating the optical reader, the decoder, and the processor.

The decoder 20, illustrated in FIG. 4, receives the output signal from the optical reader as the label is scanned. This signal has a rather rounded waveform and includes background noise and thus must be conditioned into a rectangular waveform for the decoder. Accordingly, a digital signal conditioner 120 eliminates the noise and converts the input data to rectangular waveform which goes high each time a positive threshold level is exceeded and goes low each time a negative threshold level is exceeded. Hereinafter whenever the terminology "high" or "low" is used with reference to a signal, it should be understood that, since the signals are two level signals, the signal condition is relative to its other state. This rectangular waveform is then fed to a sampling sequence generator 122.

The sampling sequence generator 122 is responsive to the first ZERO bit (bit 1) following the leader which is the sync bit of the preamble to start generating a linear ramp signal which has a duration of one word (six bits). During the sixth bit, or reset bit, the ramp voltage is reset back to ZERO so that it can generate another ramp starting when the next sync bit of the first data word is received. During the second bit time interval through the sixth bit time interval of each word, the ramp signal is threshold detected at five spaced intervals so that five sampling pulses are generated at five selectively spaced time intervals which are preferably equally spaced and will be positioned within the duration of a received bit when received within the range of data rates;. The first four of these sampling pulses are used for reading the conditioned information during the four data bit times, and the last sampling pulse is used to generate the reset pulse and to sample the level of reset bit (six) for generating a RESET·WHITE signal. The sampling pulses generated during bit times two through five are used to enable a buffer storage 124.

The buffer storage 124 is thus enabled to receive the four serial bits of data information from the digital signal conditioner 120 wherein the data words are stored until they can be transferred in parallel to a data digit storage 126. Considering the operation of the buffer storage 124 on the preamble, which, as previously stated, is a unique word that cannot be obtained if the label is scanned from the wrong direction the four data pulses of the preamble bits (bits two through five are received) and are fed to a preamble recognizer 128 which will enable the data digit storage 126 to receive the subsequent data words only after a valid preamble is recognized. The data bits 2 through 5 of the preamble are not transferred from the buffer storage 124 to the data digit storage 126 but are cleared from the buffer storage before the first data word is received.

A digit counter 130 which is a three stage binary counter, is initially cleared and maintained clear until a valid preamble is recognized, whereupon it is stepped or loaded by the RESET·WHITE pulse at the end of each word. The digit counter 130 is reset on the last decimal digit count or, in this embodiment since there are five decimals, after five data words, i.e., after the sync pulses associated with six words have been received. In addition, the digit counter is reset after a delay sufficient to compensate for the probability that no valid word is going to be received. Accordingly, this delay can be longer than the duration of the five data words received from the scanned label by a factor greater than one. Thus, the digit counter 130 is cleared for processing the next data or else for processing the pulse when rescanning the label. The output from digit counter 130 can be a three-bit parallel binary output which is fed to a transfer generator 132.

The transfer generator 132 generates a one out of five output transfer signal in response to the binary digital input signals received from the digit counter 130 and a valid preamble signal from preamble recognizer 128. Each one of these five output signals relates to one of the five decimal digits and can start with the most significant digit or the least significant digit depending upon the coding sequence on the label. These outputs are stepped, one at a time, at each RESET·WHITE pulse until each of the five outputs have produced a signal one word long associated with each decimal digit. These one out of five decimal digit signals are fed to enable the data digit storage 126 to store data words in the proper sequence.

The data digit storage 126 includes five storage bins or storage registers which are each responsive to an individual one of the five output signals from the transfer generator 132 and are all responsive to a valid preamble signal from the preamble recognizer 128 so that they can sequentially store the data words received by the buffer storage 124. For example, considering the first data word following the preamble, or the most significant digit, to be a decimal five, it would have been received in binary form as 1011 and would have been stored in the buffer register in that binary form. Then in response to the signal derived from each RESET·WHITE signal, the stored data word is transferred to a first storage register in the data digit storage 126. Thereafter, the next one of the five outputs from the transfer generator enables the next storage register in the data digit storage 126 to receive the next data word or next least significant digit stored in the buffer storage 124. This procedure is continued until all five decimal digits have been stored.

As a precaution, in case the label cannot be read, a mechanical input 134 such as a key board is coupled to the data digit storage 126 so that the information can be stored in the different data digit storage registers by the operator. The stored data signals are then fed to a data processor such as a digit display 136 where they will be displayed when the data read-in is complete and verified. It should, of course, be understood that other data processors could be used or that the data could be processed in other ways.

In order to verify the data, the information stored in the registers of the data digit storage 126 are fed to a data verification and data complete circuit 138 wherein they are checked for validity against a second reading of the label through an EXCLUSIVE OR operation. If they compare and are thus valid, and all five words are stored, then the numerals in the digit display 136 are enabled and the coded label information is visually displayed.

Figure 6A:
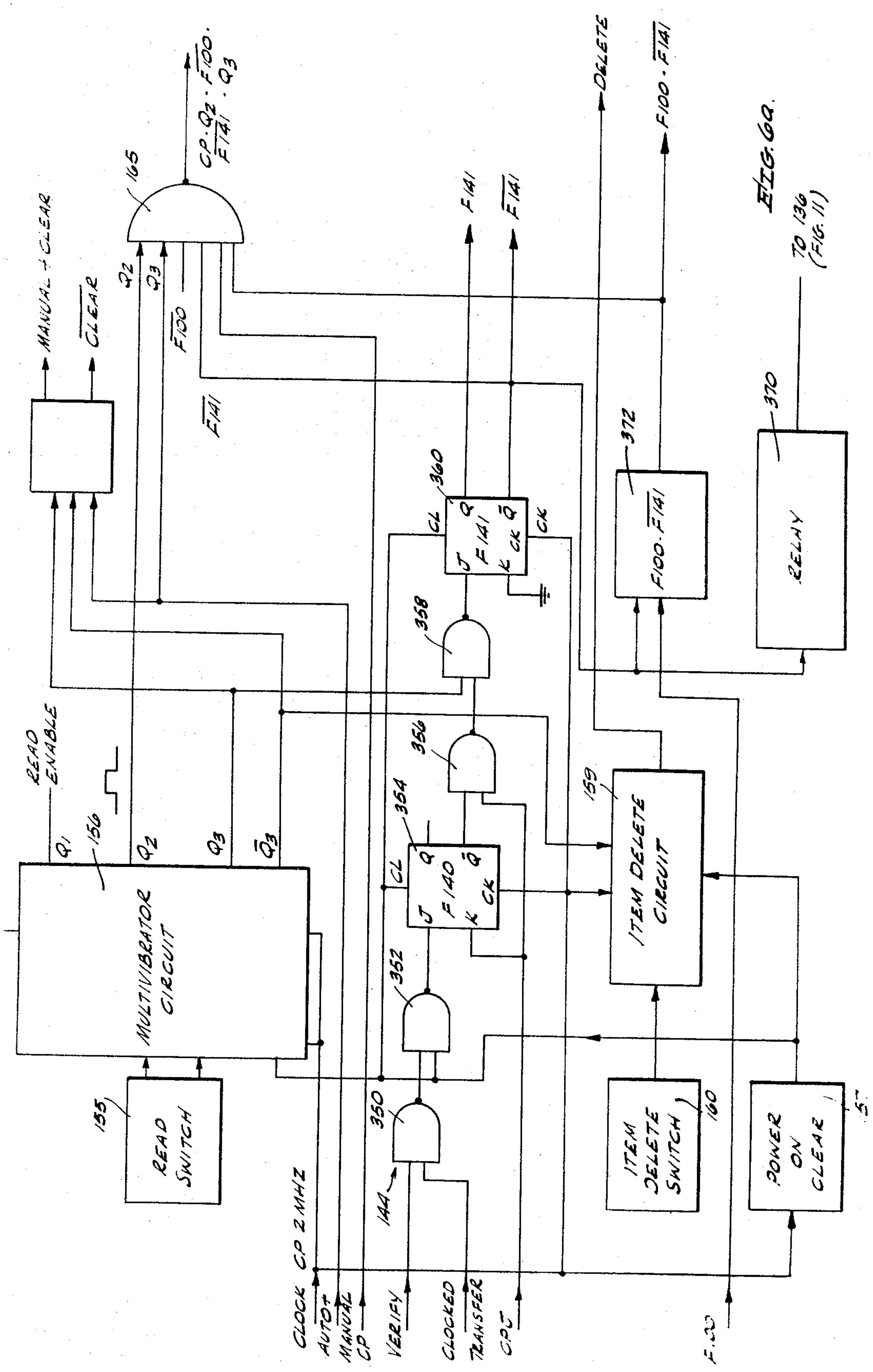
FIG. 6*a* is a schematic diagram of a portion of the data verification and data complete circuit, the read enable switch, and the delete switch of FIG. 4.

Referring now to the details of the decoder 20, a circuit illustrated in FIG. 6*a* includes a read enable switch 155 which is closed to energize a multivibrator circuit 156. The multivibrator circuit 156 can include a first bistable flip-flop which is set to generate a read enable output signal when the read enable switch 155 is closed. In addition, the multivibrator circuit can include a one-shot multivibrator circuit which will produce a MANUAL and CLEAR output pulse and a $\overline{\text{CLEAR}}$ output pulse having a duration equal to the period of a system clock pulse, cp. In the particular embodiment built, the system clock pulse cp has a frequency of 2 mHz.

The circuit of FIG. 6*a* further includes a power on clear circuit 157 which generates an output pulse which goes low for a predetermined time period (about 500 ms) when the power is first turned on. This output pulse is used to clear the flip-flops in the system when the power is first turned on. This circuit can include a conventional r-c timing circuit which is utilized to trigger a pulse-shaping circuit such as a monostable multivibrator or be of any other conventional structure.

As will be explained in more detail subsequently, a verify signal is generated by data verifyer circuit 158 by comparing at an EXCLUSIVE OR circuit a second reading of data words on the label with data previously stored in the digit data storage 126 on a first reading of the label. If all of the data compares an output signal from the data verifier 158 is switched to turn on the digital display 136. If, however, any data word does not match, the digital display 136 is not turned on. At this time, it is sufficient to state that the $\overline{Q}$ outputs $\overline{F141}$ is low and the Q output F141 is high until such a verification takes place.

The circuit of FIG. 6*a* further includes an item delete circuit 159 which generates a delete command signal which is utilized by a computer (not shown) for subtracting an item after it has already been read if a customer decides against buying the item. This operation is initiated when the cashier pushes the item delete switch 160.

Figure 6B:
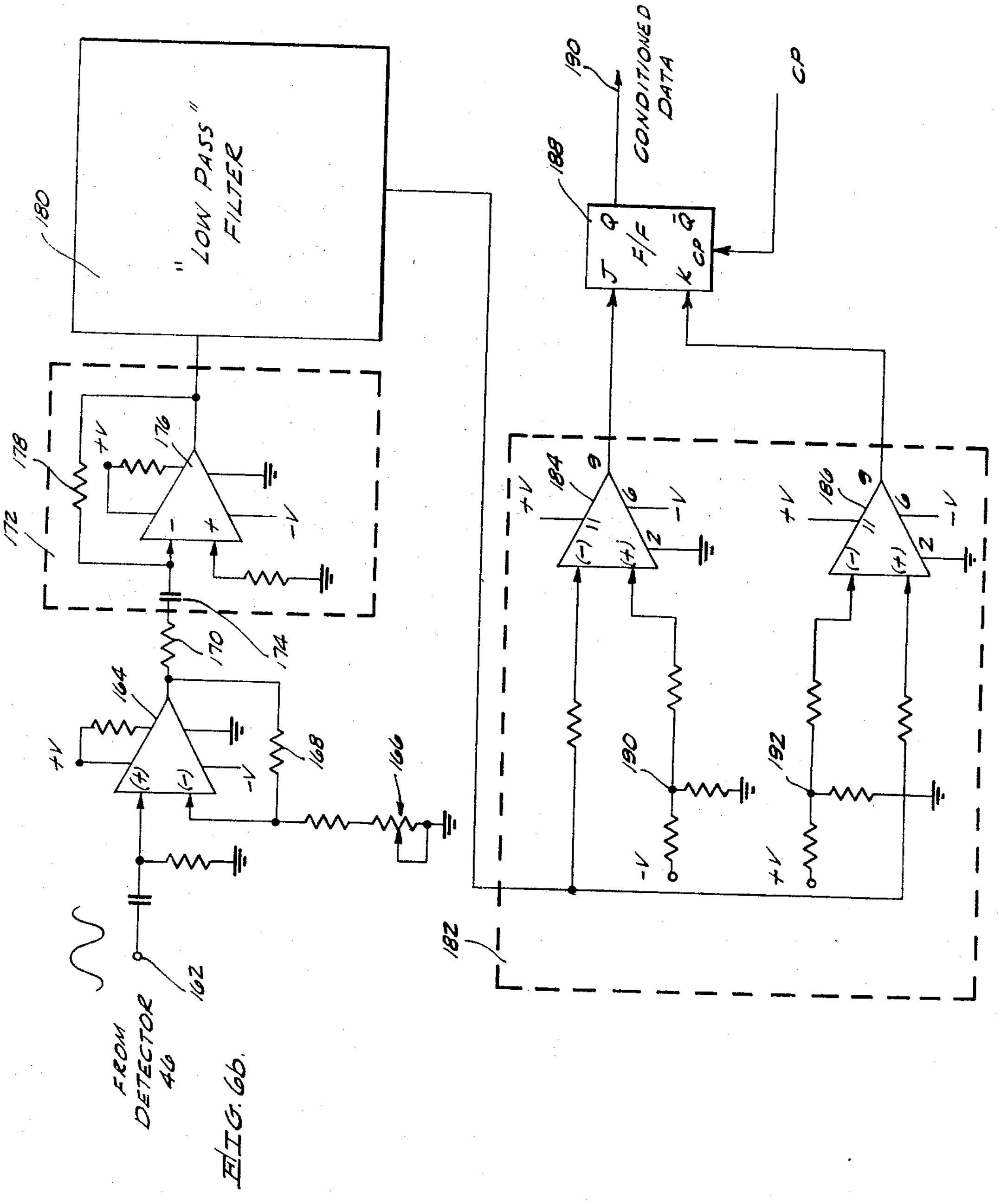
FIG. 6*b* is a schematic diagram of the signal conditioner of FIG. 4.

Referring now to the details of the digital signal conditioner 120, shown in schematic form in FIG. 6*b*, in operation, the pulse signal produced by scanning the label is received at input terminal 162 and is fed through a series coupling capacitor and across one end of a shunting input resistor to one input terminal of an operational amplifier 164. Another input terminal of operational amplifier 164 receives a reference signal from the junction between a potentiometer 166 having its other end connected to ground, and a feedback resistor 168, having its other end connected to the output of the operational amplifier 164. This operational amplifier 164 functions as an impedance buffer and provides an amplification ratio greater than one. One circuit that will satisfactorily provide such requirements is the H9000A Operational Amplifier manufactured by Union Carbide Electronics and described and illustrated in the bulletin, "Operational Amplifier Silicon Modular H9000A" by Union Carbide Electronics, dated January 1966, and copyrighted 1966 by Union Carbide. It should, of course, be understood that although this particular operational amplifier has been utilized in an embodiment that has been constructed, other possible operational amplifiers can be used, such as those described and illustrated in Korn and Korn, Electronic Analog Computers, N.Y., McGraw-Hill 1956, 2nd Edition.

The output from operational amplifier 164 is fed through a series damping resistor 170 to a differentiator 172.

The differentiator 172 differentiates the leading and trailing edges of the pulse signal into positive and negative pulse spikes. In operation, the pulse signal is fed through a series capacitor 174 to an inverting input terminal (−) of an operational amplifier 176. A non-inverting input terminal (+) of the operational amplifier 176 is connected to a ground terminal through a resistor. A feedback resistor 178 is connected between the output terminal of the operational amplifier and the inverting input terminal (−) to limit the amplifier gain. One type of operational amplifier that can be used is the previously referenced H9000A manufactured by Union Carbide Electronics. The positive-going and negative-going differentiated pulse spikes are then fed to a low pass filter 180 which, in this particular embodiment, can be set to pass signals in a frequency range from DC to 100 kHz. to reduce signal noise. One such low pass filter is described in "Handbook of Operational Amplifiers Active R-C Networks," 1966, Burr-Brown Research Corporation, International Airport Industrial Park, Tucson, Arizona, 85706, copyright 1966, p. 70. The filtered pulse spike signal is then fed to a threshold detector circuit 182.

The threshold detector 182 includes two parallel circuit branches, one of which includes a first differential voltage comparator 184 which detects negative pulse signals that exceed a negative threshold level and the other of which includes a second differential voltage comparator 186 which detects positive pulse spikes which exceed a positive threshold level. The output signal from the first threshold detector 184 is fed to the J input of a J-K flip-flop 188 causing the Q output level to go high at the next clock pulse fed to input terminal cp when a negative pulse spike has been detected. The output signal from the second differential voltage comparator 186 is coupled to the K input of the J-K flip-flop 188 and will switch the Q output level low at the next clock pulse when a positive pulse spike has been detected.

Both of the differential voltage comparators, 184 and 186, are identical and can be SN 72 71ON differential comparators described in "Integrated Circuits New-Products Bulletin" published by Texas Instruments, Inc., Bulletin SC10320, dated July, 1967. In operation the filtered pulse spike signals are fed to the inverting input (−) of differential voltage comparator 184 through an input resistor. The negative threshold voltage is fed to the non-inverting input (+) of the differential voltage comparator 184 from a tap point of a potentiometer 190. In operation, when this negative threshold voltage is exceeded by a pulse spike, an output signal is produced on the output line of the differential voltage comparator 184. The other differential voltage comparator 186 differs only in that the filtered pulse spike input signals are fed to the non-inverting input (+) while the positive threshold voltage is fed to the inverting input (−). Thus, when the positive threshold voltage is exceeded by a pulse spike, an output signal is produced on the output terminal and is fed to the K input of the J-K flip-flop 188.

Thus, if a J input signal is received by the J-K flip-flop 188, the very next clock pulse cp received by the flip-flop 188 will switch the Q output to its high operating state. If a K input is received by the J-K flip-flop 188, it is switched when the next clock pulse is received, whereupon the Q output goes low. As a result, the data is conditioned into a substantially noise-free rectangular wave output pulse train which corresponds to information on the received pulse signal. This conditioned data is then fed to the sampling sequence generator 122 and to the buffer storage 124, as illustrated in FIG. 4.

Figure 7:
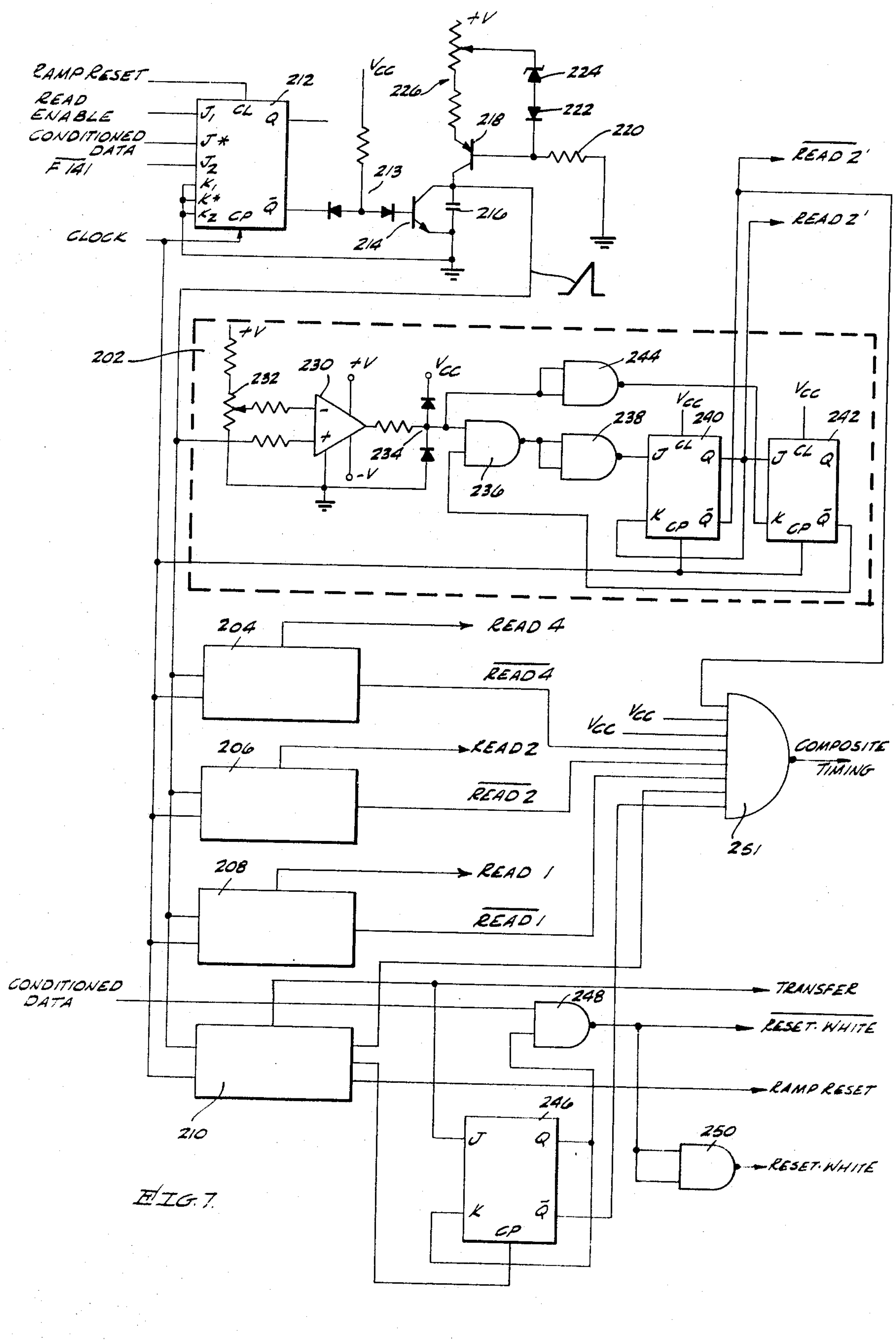
FIG. 7 is a schematic diagram of the sampling sequence generator of FIG. 4, illustrating a ramp signal generator and five threshold detector circuits.

Referring now to the details of the sampling sequence generator 122, illustrated schematically in FIG. 7, when a READ ENABLE signal and the first ZERO pulse following the leader are received, a ramp signal generator 200 generates a substantially linear ramp waveform signal, starting with the sync signal bit (bit one) of the preamble. This ramp signal is reset during the reset time period (bit six) of the preamble. If the reset bit is not a binary ONE, but is a binary ZERO, it is assumed that the sampled information is invalid and the sampling sequence will be restarted after a predetermined delay, as will be explained shortly. During the time period from the second bit through the sixth bit of each word, the ramp signal is detected at five threshold levels by five parallel threshold detectors 202 through 210 to generate five sampling pulses, READ 2', READ 4, READ 2, and READ 1, and RESET, which are used by the buffer storage 124 to sample the conditioned data at the pulse tables thereof and to reset the ramp, respectively.

Figure 8:
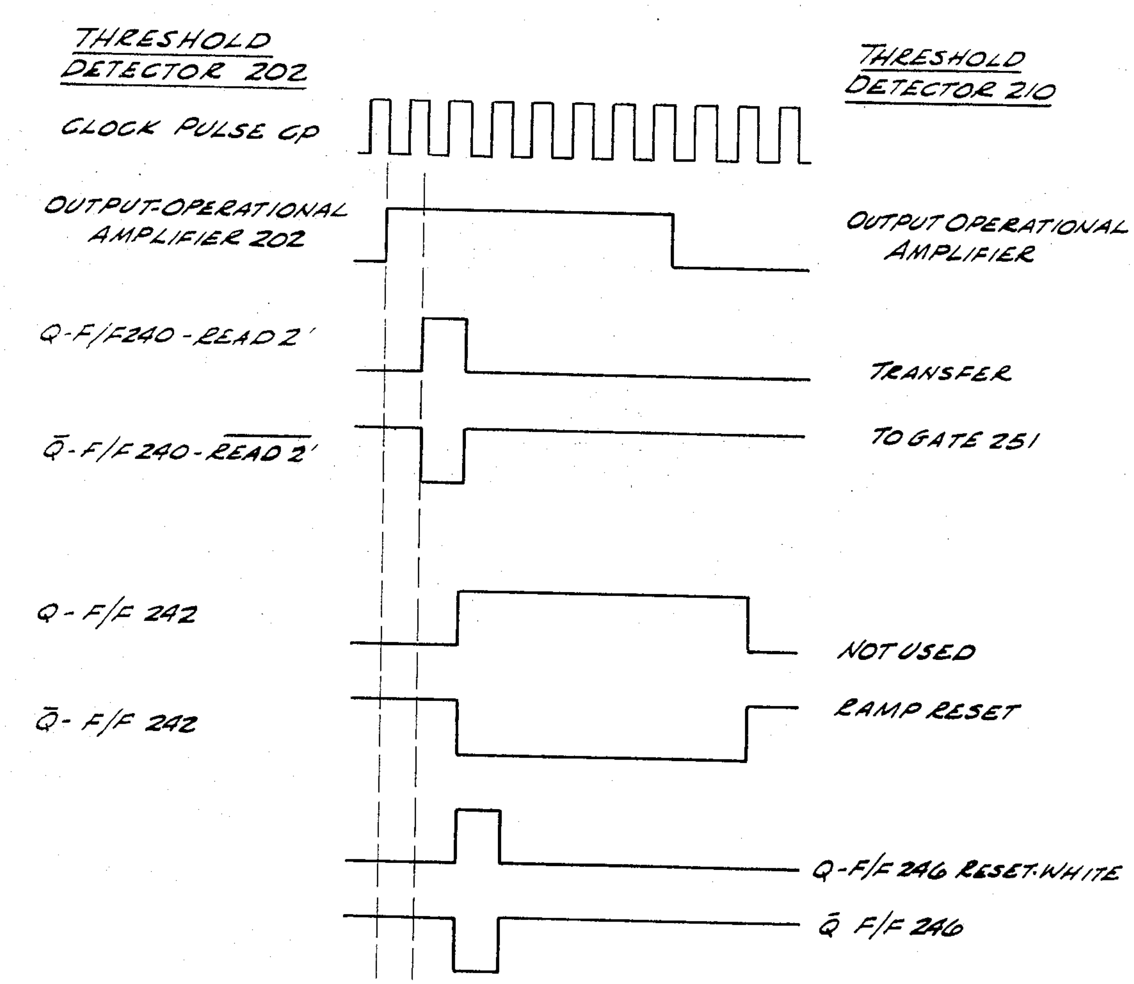
FIG. 8 is a timing chart, illustrating the wave-forms of signals generated by the threshold detectors circuit in the read sequence generator of FIG. 7.

Referring now to the sampling sequence generator 122 of FIG. 7 in more detail with further reference to the wave-forms of FIG. 8, when a J-K flip-flop 212, having three J inputs, $J_1$ J* and $J_2$ receives the READ ENABLE signal, a conditioned data signal corresponding to a ZERO, and a data not complete signal $\overline{F141}$ from J-K flip-flop (F141) 360 of the EXCLUSIVE OR data verification and data complete circuit 138, the J-K flip-flop 212 is switched on the next clock pulse cp so that the $\overline{Q}$ output goes low. It should be understood that when a reference character such as F141 or $\overline{F141}$ is placed adjacent an input terminal or an output terminal, this is a convention to indicate the outputs from a specific logic element such as J-K flip-flop (F141). The $\overline{Q}$ output is fed through a buffer circuit 213, including two series connected, oppositely-polarized diodes having the common terminal thereof connected through a resistor to a fixed potential terminal, to the base terminal of a normally ON transistor 214. The low signal $\overline{Q}$ turns off the transistor 214, thereby enabling a charging capacitor 216 shunted across the collector and emitter terminals of the transistor 214 to be charged. A constant current is supplied to the charging capacitor 216 from the collector of a transistor 218 as follows. A bleeder resistor 220 is connected between the base terminal of the transistor 218 and a ground terminal. A temperature-compensating diode 222 and a voltage-regulating Zener diode 224 are connected in series between the base terminal of transistor 218 and an emitter voltage terminal to establish the terminal to base voltage. A potentiometer and emitter resistor 226 are connected between the emitter voltage terminal and emitter of transistor 218 to establish and regulate the constant emitter current thereto. This results in a constant collector current at the collector terminal which charges the capacitor 216 linearly to generate a ramp voltage waveform during the time that the transistor 214 is turned off. This ramp voltage is fed to the five-level threshold detector circuit. As will be explained in more detail shortly, the ramp signal will be reset at the end of each word.

The five-level threshold detector circuit includes five threshold detectors, 202 – 210, connected in parallel circuit relationship, each of which is set to one of five spaced voltage levels so that five spaced pulses, READ 2', READ 4, READ 2, READ 1 and RAMP RESET, are generated. Since the first five threshold detectors are substantially the same, only the first one, 202, for generating the sampling pulse READ 2' during the second bit time is described in detail as follows.

The threshold detector 202 includes basically a voltage level detector which drives a pulse generating circuit for generating a narrow sampling pulse relative to the digit word whenever the threshold voltage is exceeded. More specifically, an operational amplifier 230, such as a μ A 709C High Performance Operational Amplifier, manufactured by Fairchild Semiconductor Company and described in their brochure SL-124 No. 2320-241-76 10M, dated October 1965. In operation, a threshold level voltage level set at the pick off point on a potentiometer 132 is fed through a resistor to the inverting input (−) of the operational amplifier 230. The ramp voltage is fed through a resistor to the non-inverting input (+) of the operational amplifier 230 whereupon, when the ramp voltage is more positive than the threshold voltage, the output terminal of the operational amplifier goes high, as illustrated in the timing chart of FIG. 8, and remains at that level until the ramp voltage is reset. The signal on the output terminal of operational amplifier 230 is fed through a resistor and a diode clamp 234 to one input of a NAND gate 236 in the pulse generating circuit. Since the other input to the NAND gate 236 is normally high, the output of the gate goes low and is fed simultaneously to the two inputs of an inverting NAND gate 238. As a result, the output of NAND gate 238 goes high and is fed to the J input of a J-K flip-flop 240. Consequently, when the next negative-going edge of the system clock pulse cp is received by the J-K flip-flop 240, the Q output goes high for one clock pulse period, as illustrated in FIG. 8. This Q output of flip-flop 240 is fed to the buffer storage 224 (FIG. 4) as the READ 2′ pulse. In addition, the Q output of flip-flop 240 is fed to the J input of a second J-K flip-flop 242 such that when the next system clock pulse cp is received, the $\overline{Q}$ output of flip-flop 242 goes low and is fed back to disable the NAND gate 236 to maintain the circuit in that condition until the end of the word. In order to reset the pulse circuit at the end of the word, the ramp signal fed to the one input of the operational amplifier 230 is reset to a low level so that the output of the operation amplifier goes low. This output signal is then fed through the diode clamp 234 to an inverting NAND gate 244. The NAND gate output goes positive when reset occurs, and is fed to the K input of the J-K flip-flop 242 causing the $\overline{Q}$ output to go high. This $\overline{Q}$ output is then fed back to the NAND gate 236, thereby enabling it when the ramp voltage again exceeds the threshold voltage. In addition, the signals fed through NAND gate 236 and NAND gate 238 to the J input of flip-flop 240 reset it on the next clock pulse cp so that the Q output again goes low and the $\overline{Q}$ output again goes high.

As previously stated, the threshold detectors 204 through 210, associated with the sampling pulses generated during the bit time periods $t_3$ to $t_6$ are substantially the same as the above described threshold detector except that they operate at other threshold levels. Thus, they are not described in detail except for the last stage of the fifth threshold detector which is utilized to generate a TRANSFER signal and reset signal only when the sampled data associated with the reset pulse (bit six) is a binary ONE to reset the ramp signal generator. This feature has the advantage of synchronizing the decoder operation with the optical reader operation to reduce cumulative timing errors.

More specifically, instead of generating a digit read signal, a J-K flip-flop in the threshold detector block 210, corresponding to the Q output of the J-K flip-flop 240 in threshold detector 202 generates a TRANSFER pulse and an output signal corresponding to $\overline{Q}$ output of J-K flip-flop 242 which is utilized to generate a RAMP RESET pulse which goes high, and is fed back to clean the J-K flip-flop 212 associated with the ramp signal generator. The high TRANSFER pulse is fed to the J input of a J-K flip-flop 246 which is normally low. When the next clock pulse is received, the Q output of flip-flop 246 will go high for the period of one clock pulse cp, as illustrated in the waveforms of FIG. 8. This Q pulse is fed to a NAND gate 248 which, if the conditioned data corresponding to the reset pulse, or bit six, is a binary ONE (WHITE), will switch the NAND gate 248 so that the output generates a RESET·WHITE pulse. In addition, a $\overline{\text{RESET·WHITE}}$ complement is generated by an inverting NAND gate 250 which is coupled to receive the output signal from NAND gate 248. In addition, the $\overline{Q}$ outputs of all of the J-K flip-flops in the threshold detectors 204 – 280 corresponding to J-K flip-flop 240 in threshold detector 202 are fed to a NAND gate 251 which produces a high COMPOSITE TIMING pulse any time any one of the inputs goes low.

Figure 9:
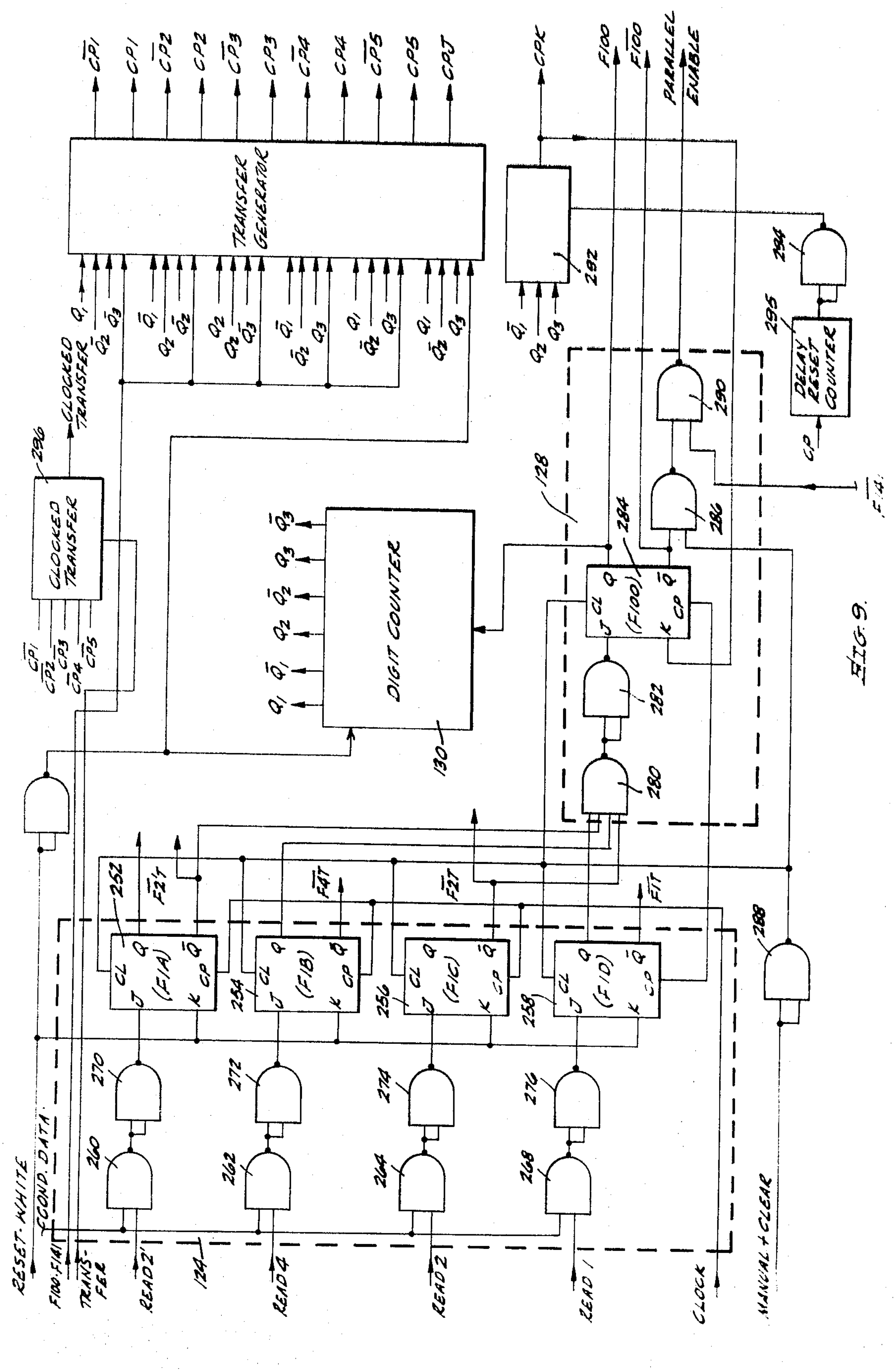
FIG. 9 is a schematic diagram of the buffer storage, the preamble recognizer, the digit counter, and the transfer generator of FIG. 4.

Referring now to the details of the buffer storage 124, preamble recognizer 128, digit counter 130, and the transfer generator 132, reference is made to the schematic of FIG. 9. The buffer storage 124 illustrated in FIG. 9 is a four-stage parallel register which is operable to receive the conditioned data bits associated with the bit times $t_2$ through $t_5$ of the preamble word and the subsequent data words in response to the sample pulses READ 2′ through READ 1 received from the sampling sequence generator 122 illustrated in FIG. 7. More specifically, the buffer storage includes four parallel J-K flip-flops 252, 254, 256, and 258 which are initially in a cleared state after receiving the MANUAL + CLEAR signal from the multivibrator circuit 156 of FIG. 6*a*. The four bits of conditioned data are sequentially fed to the J inputs of the individual J-K flip-flops 252 – 258 through NAND gate logic in response to the READ signals READ 2′, READ 4, READ 2, and READ 1. In other words, the conditioned data received on terminal 259 is fed to one input of all four parallel NAND gates 260, 262, 264, and 268. The individual high READ signals are fed to the other input terminal of individual ones of these NAND gates such that the level of the conditioned data bit will determine the signal level fed to the J-K flip-flop. For example, if a ONE is high, the output of NAND gate 260 is low when the READ 2′ signal is received. This signal is fed through an inverting NAND gate 270 to the J input of the J-K flip-flop 252, whereupon the $\overline{Q}$ output goes low at the next clock pulse cp. If, however, the conditioned data is a ZERO, the input to NAND gate 260 is low whereupon the NAND output goes high. This high output is fed through inverting NAND gate 270 to the J input of J-K flip-flop 252 whereupon the $\overline{Q}$ output stays high at the next clock pulse. This operation is repeated for the other three stages of the buffer storage in response to the READ 4 pulse, the READ 2 pulse, and the READ 1 pulse. The $\overline{Q}$ output of the flip-flops 252 through 258 are representative of the binary level of the stored data. However, for preamble recognition, the $\overline{Q}$, Q, $\overline{Q}$, and Q outputs of the four flip-flops are fed to the preamble recognizer 128 for recognizing the unique preamble word.

As will be explained shortly, during the sixth pulse, or the reset pulse of each word, the K inputs of the four J-K flip-flops 252 through 258 will simultaneously receive the RESET·WHITE pulse from the read sequence generator 122 of FIG. 7 to reset the registers if the reset pulse is a ONE.

Figure 10:
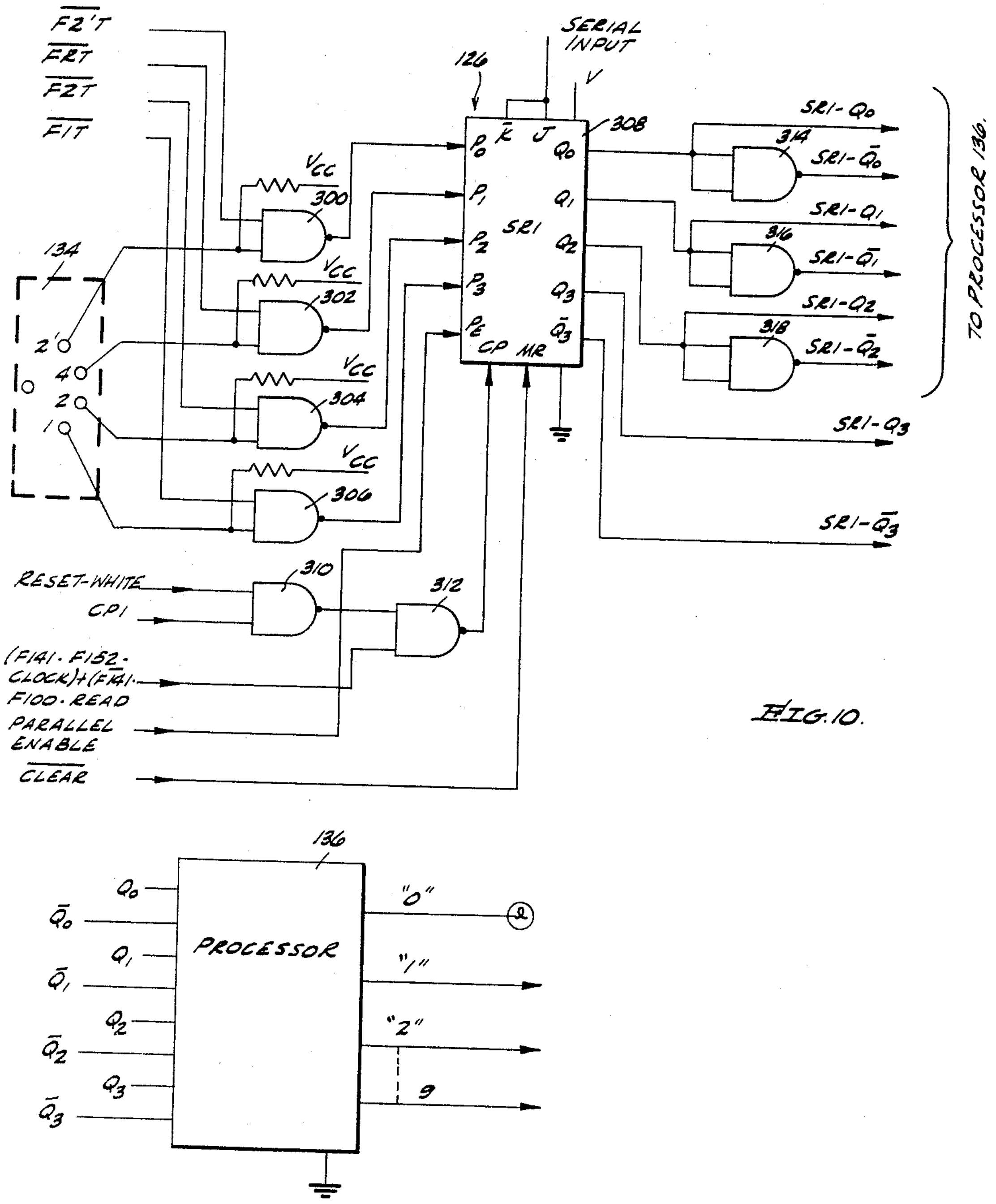
FIG. 10 is a schematic of a decimal digit storage stage in the data digit storage of FIG. 4.

Referring now to the details of the preamble recognizer 128, during the preamble word, four inputs are fed to a logic circuit, including NAND gate 280 and 282 and a J-K flip-flop 284 so that an output signal is produced by the flip-flop whenever a valid preamble is received. More specifically, when the four inputs to NAND gate 280 are all high, the output of the NAND gate goes low and is fed through both inputs of the inverting NAND gate 282 to the J input of the J-K flip-flop 284. Consequently, on the next clock pulse cp, the Q output of the flip-flop 284 goes high. This Q output signal is utilized as a F100 valid preamble signal by the system and is fed to the transfer generator 132 and the digit counter 130, as will be explained in more detail shortly. At the same time, the $\overline{Q}$ output goes low and is utilized as a $\overline{\text{F100}}$ valid preamble complement signal by the system and is fed to one input of a NAND gate 286. The other input of the NAND gate 286 receives a MANUAL + CLEAR signal fed through an inverting NAND gate 288 so that the input to NAND gate 286 is high, whereupon the NAND output is also high. This high output is fed to one input of another NAND gate 290 so that its output goes low and stays low until a second input $\overline{\text{F141}}$ is received from the data verifier 158 of FIG. 6*a* by the NAND gate 290 which is indicative that the display is on, as will be explained in more detail shortly. This output signal of NAND gate 290 is a PARALLEL ENABLE signal which is used by the data digit storage 126, as will be explained in more detail with reference to FIG. 10.

The digit counter 130 can be a three-stage serial binary counter which has all three stages wired or locked in CLEAR until a valid preamble is recognized. When a valid preamble is recognized, the Q output from the J-K flip-flop 284 in preamble recognizer 128 goes high, thereby enabling the counter stages to increment when each RESET·WHITE pulse is received from the read sequence generator 122 of FIG. 7. When the RESET·WHITE pulse associated with the last word is received, the outputs from the counter stages are fed to a logic circuit which generates an output signal which is in turn fed to the K input of the J-K flip-flop 284 in the preamble recognizer to switch its state on the next clock pulse so that the Q output goes low and clears the counter stages. As a result, the counter is ready to count when the next reading of a label is to occur. In addition, the counter is reset to ZERO after a delay longer than the time it takes to read a label (250 microseconds in this embodiment), in response to a DELAY RESET pulse fed through an inverting NAND gate 294 to the logic circuit 292. This DELAY RESET pulse can be produced by feeding the system clock cp to a counter 295 in a conventional manner, which is enabled to count from a cleared condition whenever a valid preamble is recognized. The output signal from the logic circuit 292 is also fed to the K input of the J-K flip-flop 284 in the preamble recognizer 128 to switch the Q output low and to clear the counter 130. The binary output from the three stages of the digit counter 130 are fed to a transfer generator 132.

The transfer generator 132 receives the binary output from the counter 130 and converts it to a one out of five or decimal digit output CP1, CP2, CP3, CP4, and CP5 of the transfer generator. These decimal digit outputs CP1 through CP5 each have a duration of one word and occur sequentially. In addition, at the end of the last word (data word five) and the end of decimal digit output CP5, a pulse CPJ, having a duration of one clock pulse, is produced by the encoder in response to the output of the counter and the $\overline{\text{RESET}\cdot\text{WHITE}}$ signal received from the read sequence generator 122 of FIG. 7. In addition, a CPK pulse, having a period of one clock pulse by the logic circuit 292 during the time period following pulse CPJ. The five decimal digit outputs, CP1 through CP5, are fed to the data digit storage 126. These five decimal digit outputs CP1 – CP5 are also fed to a logic circuit 296 which also receives the TRANSFER signal from the read sequence generator 122 of FIG. 7 so that a CLOCKED TRANSFER pulse is generated once each word. This CLOCKED TRANSFER pulse is fed to the EXCLUSIVE OR circuit of FIG. 11, as will be explained in more detail shortly.

The data digit storage 126 is a 20-bit binary coded decimal storage and includes five four-bit storage registers — one for each decimal digit. In operation, each storage register is sequentially enabled by the one out of five decimal digit signals CP1–CP5 from the transfer generator 132 to receive data word digits 2′, 4, 2, and 1 from the buffer storage 124. More specifically, the $\overline{Q}$ outputs of the J-K flip-flops 252 through 258 of the buffer storage 124 in FIG. 9 are fed in parallel to one of the inputs of each of the four parallel NAND gates 300 through 306 so that, depending upon whether the bits are ONE or ZERO, the output of the NAND gates will go high or low. These high or low outputs from the four NAND gates are fed in parallel to the $P_0$, $P_1$, $P_2$ and $P_3$ inputs, respectively, of a four-bit parallel entry, parallel output shift register 308 such as the CCSL 9300 Medium Scale Integration Four-Bit Shift Register, manufactured by Fairchild Semiconductor and described in their Preliminary Data Sheet dated Sept. 1967, No. 3435-285-87 10M, copyrighted 1967. This four-bit shift register 308 is enabled to store the data when the PARALLEL ENABLE signal is received from the preamble recognizer 128 of FIG. 9 and when the RESET . WHITE signal and the decimal digit select signal CP1 are both high and received at NAND gate 310 to cause the output signal thereof to go low. This low signal is fed to one input of a NAND gate 312 while the other input receives a disable signal from the digit storage clock disable circuit 165 of FIG. 6a. When this disable signal is high, the register can be loaded. If, however, the disable signal is low, the register cannot be loaded, whereupon the output of NAND gate 312 goes high and is fed to the clock pulse input $\overline{CP}$ of the shift register 308. The signal level of the $\overline{Q}_0$ through $\overline{Q}_3$ and their complements $Q_0$ through $Q_3$ outputs of the shift register 308 is representative of the digital signals stored therein. In addition to the output signals $Q_0$, $Q_1$, $Q_2$, and $Q_3$, complementary output signals $\overline{Q}_0$, $\overline{Q}_1$, $\overline{Q}_2$ are derived by feeding each of the respective signals $Q_0$, $Q_1$, $Q_2$ through parallel inverting NAND gates 314, 316 and 318. In addition, the complement signal $\overline{Q}_3$ is derived directly from the shift register 308. These eight digital output signals are fed to a binary to decimal encoder associated with the most significant digit of a five decimal digit output display 136.

There are four other shift registers, each of which is substantially identical to shift registers 308, and each of which is associated with an individual one of the decimal digits. The other storage registers are responsive to the one out of five decimal digit select signals CP2, CP3, CP4 and CP5, respectively.

If the particular label cannot be read by the optical reader 108, a mechanical override is provided where-in a mechanical input 134 is fed to the NAND gates 300 through 306. The signal level on these mechanical switch contacts will represent a ONE or a ZERO and will switch the output of the NAND gates 300 through 306 accordingly, whereupon the information will be stored in the four-bit register 308 and the other shift registers in the manner previously described with regard to information received from the buffer storage 124.

The digit display 136 can include a binary to decimal one out of 10 encoder in which each one of the ten outputs is connected to close a circuit connection to one side of individual ones of ten display lamps, each one of which is associated with one decimal digit 0 through 9.

In order to ensure that only verified data is displayed after all five digits are stored, the EXCLUSIVE OR, data verification, and data complete circuit 138 which is connected to the other side of the individual lamps, will not complete a power supply circuit to the lamps until the data is verified and is complete.

The data stored in data digit storage 126 is verified by reading the label a second time, storing the second reading of the digit in the buffer storage 124 and then comparing the buffered data one decimal digit at a time with the previously stored data in the data digit storage 126 to generate an output pulse by means of an EXCLUSIVE OR circuit if any one of the digits does not compare on both readings.

Figure 11:
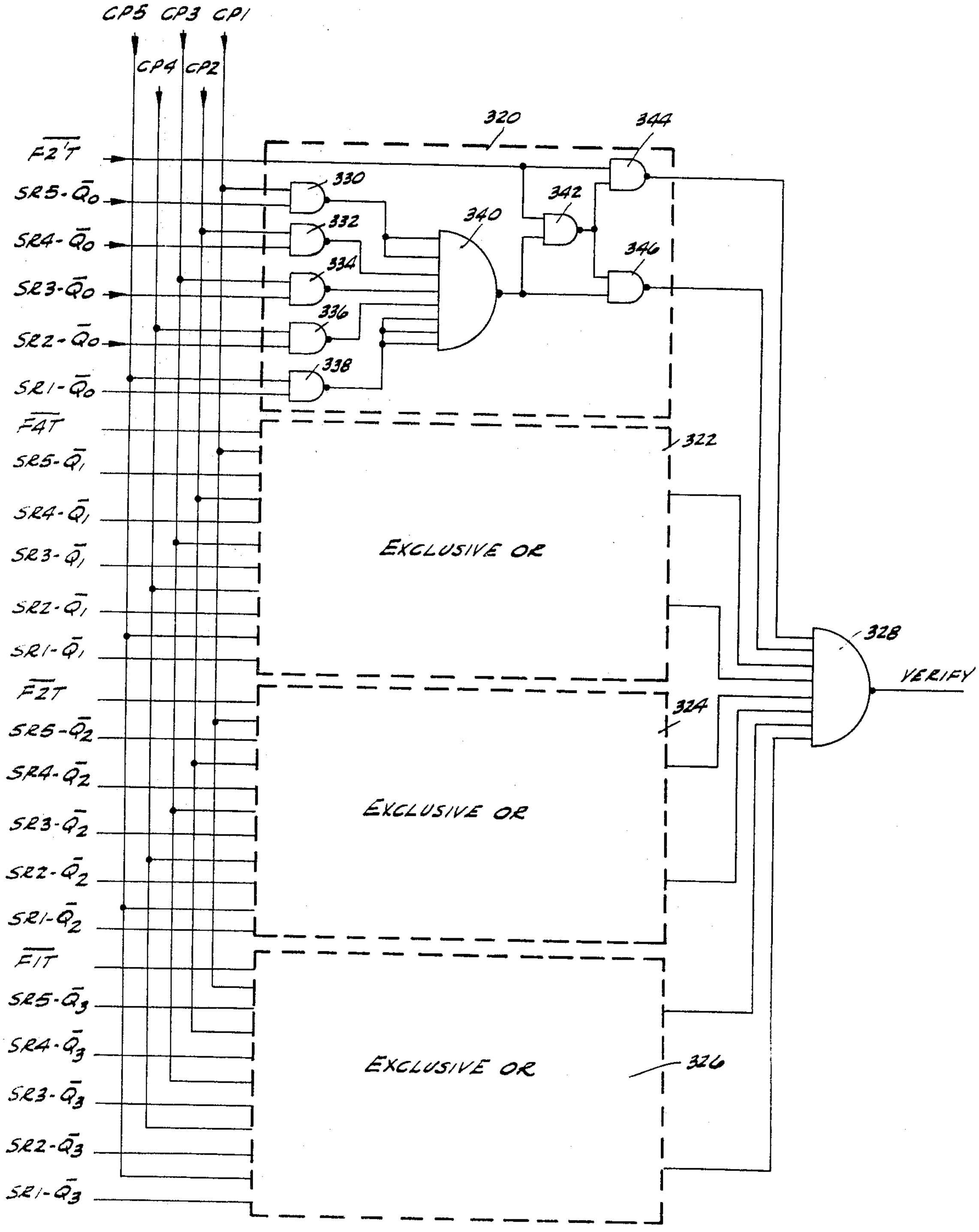
FIG. 11 is a block diagram of an EXCLUSIVE OR circuit in the data verification and data complete circuit of FIG. 4.

Structurally, the EXCLUSIVE OR circuit 320 of FIG. 11 includes four parallel EXCLUSIVE OR logic circuits 320, 322, 324 and 326, having their outputs connected to a common NAND gate 328. Each of the EXCLUSIVE OR circuits has one input terminal which is connected to receive the buffer storage signal from a $\overline{Q}$ output of an individual one of the flip-flops 252, 254, 256 and 258 in the buffer storage 124 of FIG. 9. Thus, each individual one of the EXCLUSIVE OR circuits is associated with only one of the bits 2′, 4, 2 and 1, respectively, of every data word. The other inputs to the EXCLUSIVE OR circuits include the decimal digit signal CP1, CP2, CP3, CP4 and CP5 generated by the transfer generator 132 of FIG. 9, and the digital outputs $\overline{Q}_0$, $\overline{Q}_1$, $\overline{Q}_2$, and $\overline{Q}_3$, respectively, from the shift registers 308 in the data digit storage 126 of FIG. 10.

Since EXCLUSIVE OR circuit 320 is substantially identical to the EXCLUSIVE OR circuits 322, 324, and 326, only the operation of EXCLUSIVE OR circuit 320 is explained in detail with regard to the first bit 2′ of the most significant digit stored in shift register 308 of the data digit storage 126.

In operation, the decimal digits CP1 through CP5 and the outputs $\overline{Q}_0$, $\overline{Q}_1$, $\overline{Q}_2$ and $\overline{Q}_3$ from the data digit storage 126 are translated by a NAND gate means so that all four bits of the first or most significant digit are processed simultaneously or in parallel in the four EXCLUSIVE OR circuits 320, 322, 324 and 326. For example, referring to the EXCLUSIVE OR circuits 320, the decimal digit signal CP1, associated with the most significant digit, is received by NAND gate 330 and a corresponding NAND gate (not shown) in the other EXCLUSIVE OR circuits. When the buffered data $\overline{F2'T}$ is received from the buffer storage 124, the output of NAND gate 330 will go high or low depending upon whether the input is a ONE (high) or a ZERO (low). Thus, when the high decimal digit signal CP1 is received by NAND gate 320, its output goes low if a ONE is received from the buffer storage 124 or goes high if a ZERO is received. This same operation will occur in NAND gates 332, 334, 336 and 338 during the next decimal digits or during the four subsequent time periods associated with decimal digit pulses CP2, CP3, CP4, CP5. Thus, if a ZERO is received and consequently the outputs of any one of the NAND gates 330 through 338 goes low, the output of a common NAND gate 340 goes high. Conversely, if a ONE is received, the outputs of all of the NAND gates 330 through 338 remain high and the output of common NAND gate 340 remains low. The output of this common NAND gate 340 is fed as one input to an EXCLUSIVE OR logic circuit including NAND gates 342, 344 and 346. When a ONE or high signal is received from the buffer storage 124 by one input of NAND gate 342, and the other input to the NAND gate 342 from common NAND gate 340 is high because a ONE was received from the data digit storage 126, the output of NAND gate 342 goes low. This low output is fed to the NAND gate 344 along with the ONE (high) signal from the buffer storage 124, whereupon the output of NAND gate 344 goes high. The low output of NAND gate 342 is also fed to an input of NAND gate 346 and the high output of common NAND gate 340 is fed to the other input of NAND gate 346, causing its output to go high. These signals are fed to the common NAND gate 328 such that the output of NAND gate 328 remains low when all of the inputs to it are high. Thus, if the output from NAND gate 328 is low, the signal is at a data verified level.

If, however, the data from the data digit storage 126 and from the buffer storage 124 do not correspond, at least one of the outputs from the EXCLUSIVE OR logic to the common NAND gate 328 goes low, whereupon the output from the common NAND gate will go high, thereby producing a data not-verified level in the verify signal.

This verify signal is fed to the data verify circuit 158, illustrated in FIG. 6*a*, which generates an output signal only when the data is verified to turn on the digital display 136. In operation, when a data verify signal is received from the EXCLUSIVE OR circuit, it will either be low if the data is verified, or high if the data is not verified. Considering the data verified condition first, the low data verified signal from the EXCLUSIVE OR circuit of FIG. 11 and the high CLOCKED TRANSFER pulses at the end of each word are received at the inputs of NAND gate 350 causing its output to go high. This high output and the normally high POWER ON-CLEAR signal from the power on clear circuit 157 are received at the inputs of NAND gate 352, resulting in a low NAND output. During all five data words, this low output is received at the J input of a J-K flip-flop 354, while the K input receives the normally low CPJ signal from the transfer generator 132 of FIG. 9. As a result, the J-K flip-flop does not switch and the $\overline{Q}$ output remains high. At the end of the comparison, that is, after word 5, this $\overline{Q}$ output and the high CPJ signal are received at the inputs of NAND gate 356 resulting in a low output. This low NAND output and the signal from the multivibrator circuit 156 are received at the inputs of NAND gate 358 resulting in a high output. This high NAND output is received at the J input of a J-K flip-flop 360, with the K input thereof connected to ground. As a result, the Q output of 360 goes high, and the $\overline{Q}$ output goes low, enabling power to the displays through logic switching block 370. Flip-flop 360 is cleared initially by a $\overline{CLEAR}$ pulse generated in circuit 156.

Considering now the condition when the data is not verified, the data verify signal is high. This high data verify signal is received at one input of NAND gate 350, while the other input receives the high CLOCKED TRANSFER pulse at the end of each word. As a result, the output of NAND gate 350 goes low. This low NAND output signal and the normally high POWER ON-CLEAR signal are received at the inputs of NAND gate 352, causing the output thereof to go high. This high NAND output is received at the J input of J-K flip-flop 354, causing the flip-flop to be set and the $\overline{Q}$ output to go high and the Q output to go low. At CPJ time, the low $\overline{Q}$ signal of flip-flop 354 is presented at the J input to flip-flop 360 through NAND gates 356 and 358 and flip-flop 360 Q output remains low. CPJ time is also presented to the K input of flip-flop 354, causing the Q output to go low at the next clock time in preparation for the next label scan. If all words are verified, the J-K flip-flop 354 will not be switched from the state established one clock time after CPJ time. In other words, flip-flop 354 remains reset through the entire verification process if no error is detected, thus allowing flip-flop 360 to be set at CPJ time.

Therefore, when the data is verified, the low $\overline{Q}$ output of J-K flip-flop 360 is fed to a relay circuit 370 which closes a circuit to one side of the lamps in the digital display 136 since, as previously stated, the digital display 136 can include a binary to decimal encoder having ten outputs, each of which is associated with a separate digit, 0 through 9, of the decimal system. Thus, this one out of ten decimal output will complete the circuit to one out of the ten lamps, so that that particular number can be displayed.

The $\overline{Q}$ output of flip-flop 360 and the Q output of flip-flop 284 in the preamble recognize circuit 128 of FIG. 9 are fed through a NAND gate 372 to enable the generation of CP1 through CP5.

While the salient features have been illustrated and described with respect to a particular embodiment, it should be readily apparent that modifications can be made within the spirit and scope of the invention, and it is therefore not desired to limit the invention to the exact details shown and described.

We claim:

1. An apparatus for reading a coded information medium having a plurality of spaced multibit words in a sequence of lines which produce coded information pulses of either a first level of response or a second level of response comprising:

a reader operably coupled to sequentially scan the spaced multibit words of the medium for detecting energy therefrom in the form of an elongate cross section progressing in a different incremental radial direction throughout 360° of rotation on each sequential scan for producing in response to the levels of energy detected therefrom a plurality of spaced words of coded information pulses corresponding to information on the coded medium only when the scan occurs at substantially a predetermined angle across the medium;

sampler means coupled to receive the coded information pulses of each word for sampling a narrow portion within the coded information pulse durations at a predetermined rate; and a pulse processor means including a synchronizer means coupled to said sampler means and coupled to receive the coded information pulses for resynchronizing the sampling operation of said sampler for each word in response to a portion of predetermined coded information pulse signal characteristics associated with a fixed position relative to each word.

2. In the circuit of claim 1 in which the portion of predetermined coded information pulse signal characteristics is located at the beginning of each word of coded information pulses, and said synchronizer means coupled to said sampler means and coupled to receive the coded information pulses for resynchronizing the sampling operation of said sampler means in response to each portion of predetermined coded information pulse signal characteristics received.

3. In the circuit of claim 2, in which said synchronizer means is responsive to coded information pulses from a portion of the medium which produces one level of response for a duration sufficient to synchronize said synchronizer means before receiving coded information pulses associated with a unique preamble word, said pulse processor further including recognizer means coupled to receive the coded information pulses associated with the unique preamble word for enabling said pulse processor to process data word coded information pulses only after the unique preamble word is recognized.

4. In the circuit of claim 1 in which said synchronizer means is responsive to the portion of predetermined coded information pulse signal characteristics located at the beginning of and at the end of each spaced multibit word of coded information pulses, and said synchronizer means is coupled to said sampler means to receive the coded information pulses for starting the sampling operation of said sampler means at the beginning of each word in response to the portion of predetermined coded information pulse signal characteristics located at the beginning of each word and for resetting the sampling operation thereof for each word in response to the portion of predetermined coded information pulse signal characteristics located at the end of each word.

5. In the circuit of claim 4 in which the portion of predetermined coded information pulse signal characteristics located at the end of each word have a greater duration than the duration of the other individual coded information pulses.

6. An optical reader for reading a coded information medium having a plurality of spaced coded multibit words in a sequence of bars that produce a first level of response or a second level of response to radiation comprising:

means for producing a radiation beam having an elongate cross sectional dimension;

means positioned to receive the radiation beam for repeatedly directing the radiation beam in a radial sweep motion transverse to the elongate cross sectional dimension;

means positioned to direct the radiation beam for angularly rotating the radiation beam about a location in a focal depth whereby the radiation beam sequentially sweeps through the location from different incremental radial angles on each successive sweep throughout 360°;

means positioned for detecting variations in intensity of radiation reflected from the coded information medium within the focal depth as the radiation beam sweeps therethrough and producing coded information pulses in response thereto;

sampler means coupled to receive the coded information pulses of each word for sampling a narrow portion of the signals at a predetermined rate in response to a plurality of sampling pulses equal to the number of data bits in a word and a reset bit; and a pulse processor means coupled to said sampler means and coupled to receive the sampled coded information pulses for presetting the sampling operation of said sampler before each word in response to the occurrence of a reset signal of predetermined signal characteristics associated with each spaced coded multibit word and for resynchronizing said synchronizer at the start of each word in response to a synchronizing bit associated with each spaced coded multibit word.

7. In the circuit of claim 6, wherein said pulse processor means is responsive to coded information pulses from a portion of the medium which produces one level of response for a duration sufficient to synchronize said synchronizer before sweeping a unique preamble word and said pulse processor means further including recognizer means coupled to receive coded information pulses associated with the preamble word for enabling said pulse processor to process data word coded information pulses only after the unique preamble word is recognized.

8. In the circuit of claim 6 in which the reset signals and the synchronizing bit are respectively located at the beginning of and at the end of each spaced coded multibit word of coded information pulses, and said pulse processor means is coupled to said sampler means and is coupled to receive the coded information pulses for starting the sampling operation of said sampler means at each multibit word in response to the synchronizing bit at the beginning of each multibit word and for resetting the sampling operation thereof for each multibit word in response to the reset signal located before each synchronizing bit.

9. In the circuit of claim 8 in which the reset signal bit located before each synchronizing bit has a greater duration than the duration of the other coded information pulses.

10. In the circuit of claim 6 in which the reset signal precedes the bit located before each synchronizing bit and has a greater duration than the duration of the other coded information pulses.

11. An apparatus for reading a label having coded information thereon, the coded information including a unique multibit preamble word and a series of multibit data words each word beginning with a sync bit of a first signal level and ending with a reset bit of a second signal level:

means for producing a radiation beam having an elongate, thin cross section;

means positioned to receive the radiation beam for repeatedly directing the radiation beam in a radial sweep motion transverse to the long cross sectional dimension;

means positioned to receive the radiation beam for angularly rotating the radiation beam about a location in a focal depth whereby the radiation beam radially sweeps through the location from a different radial angle on each successive sweep throughout 360°;

means positioned for detecting variations in intensity of radiation reflected from the label within the focal depth as the radiation beam sweeps therethrough and for producing coded information pulses in response thereto;

means for sampling a narrow portion of the coded information pulses in response to a plurality of sampling bits equal to the number of bits in a multibit data word and a reset bit at a predetermined rate synchronized in response to a sync bit pulse at the beginning of each word and being reset by a reset bit pulse at the end of each word, said means for sampling being initially reset by first level of coded information signal reflected from the label before the unique multibit preamble word;

recognizer means coupled to receive signals associated with the preamble word for enabling storing of the coded information pulses of the multibit data words only after unique multibit preamble word pulses have been sampled and recognized;

storage means coupled to receive the sampled coded information pulses of the multibit data words and being responsive to said recognizer means for storing the information associated with the coded information pulses of the series of multibit data words when the radiation beam sweeps the label a first time;

means coupled to said storage means for receiving the stored information pulses and coupled to receive the coded information pulses of the series of multibit data words when the radiation beam sweeps the label a second time for comparing the corresponding signals produced on the first and the second sweeps and generating an output signal only if the first and the second received coded information pulses of the series of data words coincide; and means coupled to receive the stored information pulses and to receive the output signal from the last said means for further processing the information only when the output signal is received.

* * * * *